US011232278B2

(12) United States Patent
Cao et al.

(10) Patent No.: US 11,232,278 B2
(45) Date of Patent: Jan. 25, 2022

(54) FINGERPRINT IDENTIFICATION AND DETECTION CIRCUIT, METHOD AND DISPLAY DEVICE

(71) Applicant: BOE TECHNOLOGY GROUP CO., LTD., Beijing (CN)

(72) Inventors: Xueyou Cao, Beijing (CN); Xiaoliang Ding, Beijing (CN); Haisheng Wang, Beijing (CN); Wenjuan Wang, Beijing (CN); Pengpeng Wang, Beijing (CN); Yapeng Li, Beijing (CN); Ping Zhang, Beijing (CN); Likai Deng, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/975,638

(22) PCT Filed: Oct. 16, 2019

(86) PCT No.: PCT/CN2019/111403
§ 371 (c)(1),
(2) Date: Aug. 25, 2020

(87) PCT Pub. No.: WO2021/072666
PCT Pub. Date: Apr. 22, 2021

(65) Prior Publication Data
US 2021/0117640 A1 Apr. 22, 2021

(51) Int. Cl.
*G06K 9/00* (2006.01)
(52) U.S. Cl.
CPC ....... *G06K 9/0004* (2013.01); *G06K 9/00087* (2013.01)

(58) Field of Classification Search
CPC .............................. G06K 9/0004; G06F 3/042
See application file for complete search history.

(56) References Cited

U.S. PATENT DOCUMENTS

| 2014/0355845 | A1 | 12/2014 | Benkley et al. | |
| 2016/0006969 | A1* | 1/2016 | Matsumoto | H04N 5/37455 348/308 |
| 2017/0289805 | A1* | 10/2017 | Hong | H04W 12/08 |
| 2018/0218193 | A1* | 8/2018 | Ding | H01L 27/3234 |

FOREIGN PATENT DOCUMENTS

| CN | 203930275 U | 11/2014 |
| CN | 107223303 A | 9/2017 |
| CN | 108171192 A | 6/2018 |
| CN | 109767714 A | 5/2019 |

* cited by examiner

*Primary Examiner* — Joseph R Haley
(74) *Attorney, Agent, or Firm* — Muncy, Geissler, Olds & Lowe, P.C.

(57) ABSTRACT

A fingerprint identification and detection circuit, a fingerprint identification and detection method and a display device are provided. The fingerprint identification and detection circuit includes a storage capacitor, a capacitor control circuit and a photoelectric conversion element; the photoelectric conversion element is configured to, when in a photoelectric conversion state, convert a received optical signal into a corresponding electrical signal; the capacitor control circuit is provided between the storage capacitor and the photoelectric conversion element, and is configured to perform control to store at least part of the electrical signal to the storage capacitor under control of a capacitor control signal.

19 Claims, 7 Drawing Sheets

FINGERPRINT IDENTIFICATION AND DETECTION CIRCUIT, METHOD AND DISPLAY DEVICE

CROSS-REFERENCE TO RELATED APPLICATION

The present application is a U.S. national phase application of a PCT Application No. PCT/CN2019/111403 filed on Oct. 16, 2019, a disclosure of which is incorporated in its entirety by reference herein.

TECHNICAL FIELD

The present disclosure relates to the field of fingerprint identification technology, and in particular to a fingerprint identification and detection circuit, a fingerprint identification and detection method and a display device.

BACKGROUND

Fingerprint is uneven lines on the skin at the tip of human finger; where a convex portion is called ridge and a concave portion is called valley. Fingerprint identification has almost become synonym for biometric identification because of immutability and uniqueness of fingerprints and convenience of fingerprint identification.

In the related fingerprint identification technologies, optical fingerprint identification is a research hotspot. When an optical fingerprint identification is being performed, due to differences between valleys and ridges of fingerprints, lights emitted by a light source and impinging on a finger may experience different reflections, which will cause a variation in light intensity at photosensitive devices, leading to different photoelectric signals. According to the photoelectric signals, detection of the valleys and ridges of fingerprint can be realized.

SUMMARY

In an aspect, embodiments of the present disclosure provide a fingerprint identification and detection circuit, including a storage capacitor, a capacitor control circuit and a photoelectric conversion element;

where the photoelectric conversion element is configured to, when in a photoelectric conversion state, convert a received optical signal into a corresponding electrical signal;

the capacitor control circuit is provided between the storage capacitor and the photoelectric conversion element, and is configured to perform control to store at least part of the electrical signal to the storage capacitor under control of a capacitor control signal.

Optionally, the fingerprint identification and detection circuit according to at least one embodiment of the present disclosure further includes a voltage supply circuit; where the voltage supply circuit is configured to provide a first bias control voltage to a first electrode of the photoelectric conversion element to control the photoelectric conversion element to be in the photoelectric conversion state, or, provide a second bias control voltage to the first electrode of the photoelectric conversion element to control the photoelectric conversion element to be in a forward biased state.

Optionally, the fingerprint identification and detection circuit according to at least one embodiment of the present disclosure further includes a switch control circuit and a discharge voltage terminal; where the switch control circuit is configured to perform control to connect electrically a second electrode of the photoelectric conversion element to the discharge voltage terminal under control of a switch control signal, to discharge charges in the photoelectric conversion element to the discharge voltage terminal.

Optionally, the fingerprint identification and detection circuit according to at least one embodiment of the present disclosure further includes a reset circuit; the reset circuit is configured to provide a reset voltage to the second electrode of the photoelectric conversion element.

Optionally, the photoelectric conversion element is a photodiode, the first electrode of the photoelectric conversion element is an anode of the photodiode, and the second electrode of the photoelectric conversion element is a cathode of the photodiode.

Optionally, the capacitor control circuit includes a first capacitor control transistor and a second capacitor control transistor;

the capacitor control signal includes a first capacitor control signal and a second capacitor control signal;

a control electrode of the first capacitor control transistor is electrically connected to a first capacitor control signal line, a first electrode of the first capacitor control transistor is electrically connected to a first terminal of the storage capacitor, and a second electrode of the first capacitor control transistor is electrically connected to the first electrode of the photoelectric conversion element;

a control electrode of the second capacitor control transistor is electrically connected to a second capacitor control signal line, a first electrode of the second capacitor control transistor is electrically connected to the second electrode of the photoelectric conversion element, and a second electrode of the second capacitor control transistor is electrically connected to the second terminal of the storage capacitor;

the first capacitor control signal line is configured to provide the first capacitor control signal, and the second capacitor control signal line is configured to provide the second capacitor control signal.

Optionally, the voltage supply circuit includes a first voltage supply transistor and a second voltage supply transistor; where a control electrode of the first voltage supply transistor is electrically connected to a first voltage supply control line, a first electrode of the first voltage supply transistor is electrically connected to a first bias control voltage terminal, and a second electrode of the first voltage supply transistor is electrically connected to the first electrode of the photoelectric conversion element;

a control electrode of the second voltage supply transistor is electrically connected to a second voltage supply control line, a first electrode of the second voltage supply transistor is electrically connected to a second bias control voltage terminal, and a second electrode of the second voltage supply transistor is electrically connected to the first electrode of the photoelectric conversion element;

the first bias control voltage terminal is configured to provide the first bias control voltage, and the second bias control voltage terminal is configured to provide the second bias control voltage.

Optionally, the voltage supply circuit includes a bias control voltage terminal and a bias control voltage supply circuit; where the bias control voltage terminal is electrically connected to the first electrode of the photoelectric conversion element, and the bias control voltage supply circuit is configured to supply the first bias control voltage or the second bias control voltage to the bias control voltage terminal.

Optionally, the fingerprint identification and detection circuit according to at least one embodiment of the present disclosure further includes a switch control circuit, an integral operational amplifier, an integrating capacitor and a discharge switch;

the switch control circuit is electrically connected to a switch control terminal, the second electrode of the photoelectric conversion element, and a positive input terminal of the integral operational amplifier, respectively, and is configured to perform control to connect/disconnect the second electrode of the photoelectric conversion element to/from the positive input terminal of the integral operational amplifier under control of a switch control signal provided by the switch control terminal;

a negative input terminal of the integral operational amplifier is electrically connected to a reference voltage terminal;

a first terminal of the integrating capacitor is electrically connected to the positive input terminal of the integral operational amplifier, and a second terminal of the integrating capacitor is electrically connected to an output terminal of the integral operational amplifier;

a control terminal of the discharge switch is electrically connected to a discharge control terminal, a first terminal of the discharge switch is electrically connected to the positive input terminal of the integral operational amplifier, and a second terminal of the discharge switch is electrically connected to the output terminal of the integral operational amplifier, and the discharge switch is configured to perform control to connect/disconnect the positive input terminal of the integral operational amplifier to/from the output terminal of the integral operational amplifier under control of a discharge control signal provided by the discharge control terminal.

Optionally, the switch control circuit includes a switch control transistor; where a control electrode of the switch control transistor is electrically connected to the switch control terminal, a first electrode of the switch control transistor is electrically connected to the second electrode of the photoelectric conversion element, and a second electrode of the switch control transistor is electrically connected to the positive input terminal of the integral operational amplifier.

Optionally, the fingerprint identification and detection circuit according to at least one embodiment of the present disclosure further includes an ambient light intensity detection circuit; where the ambient light intensity detection circuit is configured to detect intensity of ambient light and control the capacitor control signal according to the intensity.

In a second aspect, embodiments of the present disclosure further provide a fingerprint identification and detection method, applied to the above fingerprint identification and detection circuit, where the fingerprint identification and detection method includes:

converting, by the photoelectric conversion element when in a photoelectric conversion state, a received optical signal into a corresponding electrical signal;

performing control, by the capacitor control circuit, to store at least part of the electrical signal to the storage capacitor under control of a capacitor control signal.

Optionally, the fingerprint identification and detection circuit further includes a voltage supply circuit, and the fingerprint identification and detection method further includes:

providing, by the voltage supply circuit, a first bias control voltage to a first electrode of the photoelectric conversion element to control the photoelectric conversion element to be in the photoelectric conversion state, or, providing, by the voltage supply circuit, a second bias control voltage to the first electrode of the photoelectric conversion element to control the photoelectric conversion element to be in a forward biased state.

Optionally, a fingerprint identification and detection stage includes a reset period, an integration period and an acquisition period arranged sequentially when intensity of ambient light is greater than a predetermined intensity, and the fingerprint identification and detection method includes:

in the fingerprint identification and detection stage, performing control, by the capacitor control circuit under control of the capacitor control signal, to connect a first terminal of the storage capacitor to the first electrode of the photoelectric conversion element, and connect a second terminal of the storage capacitor to a second electrode of the photoelectric conversion element; the voltage supply circuit is configured to provide a first bias control voltage to the first electrode of the photoelectric conversion element to control the photoelectric conversion element to be in a photoelectric conversion state;

in the reset period, controlling the second electrode of the photoelectric conversion element to be fed with a reference voltage;

in the integration period, converting, by the photoelectric conversion element, a received optical signal into a corresponding electrical signal, and charging the storage capacitor with the electrical signal to change a voltage at the second electrode of the photoelectric conversion element;

in the acquisition period, performing fingerprint identification based on the voltage at the second electrode of the photoelectric conversion element.

Optionally, the fingerprint identification and detection circuit further includes a switch control circuit and a discharge voltage terminal, and the fingerprint identification and detection method further includes:

in an image lag elimination stage, performing control, by the capacitor control circuit under control of the capacitor control signal, to disconnect the first terminal of the storage capacitor from the first electrode of the photoelectric conversion element, and disconnect the second terminal of the storage capacitor from the second electrode of the photoelectric conversion element;

in the image lag elimination stage, providing, by the voltage supply circuit, a second bias control voltage to the first electrode of the photoelectric conversion element to control the photoelectric conversion element to be in a forward biased state, and performing control, by the switch control circuit, to connect electrically the second electrode of the photoelectric conversion element to the discharge voltage terminal under control of the switch control signal, to discharge charges in the photoelectric conversion element to the discharge voltage terminal.

Optionally, the fingerprint identification and detection stage includes the reset period, the integration period and the acquisition period arranged sequentially when intensity of ambient light is less than or equal to the predetermined intensity, and the fingerprint identification and detection method includes:

in the fingerprint identification and detection stage, performing control, by the capacitor control circuit under control of the capacitor control signal, to disconnect the first terminal of the storage capacitor from the first electrode of the photoelectric conversion element, and disconnect the second terminal of the storage capacitor from the second electrode of the photoelectric conversion element; where the voltage supply circuit provides the first bias control voltage to the first electrode of the photoelectric conversion element to control the photoelectric conversion element to be in the photoelectric conversion state;

in the reset period, controlling the second electrode of the photoelectric conversion element to be fed with a reference voltage;

in the integration period, converting, by the photoelectric conversion element, a received optical signal into a corresponding electrical signal, and charging the storage capacitor with the electrical signal to change a voltage at the second electrode of the photoelectric conversion element;

in the acquisition period, performing fingerprint identification based on the voltage at the second electrode of the photoelectric conversion element.

Optionally, the fingerprint identification and detection circuit further includes a switch control circuit and a discharge voltage terminal, and the fingerprint identification and detection method further includes:

in the image lag elimination stage, performing control, by the capacitor control circuit under control of the capacitor control signal, to disconnect the first terminal of the storage capacitor from the first electrode of the photoelectric conversion element, and disconnect the second terminal of the storage capacitor from the second electrode of the photoelectric conversion element;

in the image lag elimination stage, providing, by the voltage supply circuit, a second bias control voltage to the first electrode of the photoelectric conversion element to control the photoelectric conversion element to be in a forward biased state, and performing control, by the switch control circuit, to connect electrically the second electrode of the photoelectric conversion element to the discharge voltage terminal under control of the switch control signal, to discharge charges in the photoelectric conversion element to the discharge voltage terminal.

Optionally, the fingerprint identification and detection circuit further includes: a switch control circuit, an integral operational amplifier, an integrating capacitor and a discharge switch;

the integration period includes an integration reset sub-period; and the fingerprint identification and detection method further includes: in the integration reset sub-period, performing control, by the discharge switch under control of a discharge control signal, to connect a positive input terminal of the integral operational amplifier to an output terminal of the integral operational amplifier; and in a period included in the fingerprint identification and detection stage other than the integration reset sub-period, performing control, by the discharge switch under control of the discharge control signal, to disconnect the positive input terminal of the integral operational amplifier from the output terminal of the integral operational amplifier;

the controlling the second electrode of the photoelectric conversion element to be fed with the reference voltage in the reset period includes:

performing control, by the switch control circuit under control of the switch control signal, to connect the second electrode of the photoelectric conversion element to the positive input terminal of the integral operational amplifier to control the second electrode of the photoelectric conversion element to be fed with the reference voltage;

the fingerprint identification and detection method further includes:

in the integration period, performing control, by the switch control circuit under control of the switch control signal, to disconnect the second electrode of the photoelectric conversion element from the positive input terminal of the integral operational amplifier;

in the acquisition period, performing control, by the switch control circuit under control of the switch control signal, to connect the second electrode of the photoelectric conversion element to the positive input terminal of the integral operational amplifier to pass charges stored in the storage capacitor into the integral operational amplifier, to correspondingly change a voltage at the output terminal of the integral operational amplifier, so as to perform the fingerprint identification based on the voltage.

Optionally, the fingerprint identification and detection method according to at least one embodiment of the present disclosure further includes:

in the image lag elimination stage, performing control, by the capacitor control circuit under control of the capacitor control signal, to disconnect the first terminal of the storage capacitor from the first electrode of the photoelectric conversion element, and disconnect the second terminal of the storage capacitor from the second electrode of the photoelectric conversion element;

in the image lag elimination stage, providing, by the voltage supply circuit, the second bias control voltage to the first electrode of the photoelectric conversion element to control the photoelectric conversion element to be in a forward biased state; performing control, by the discharge switch under control of the discharge control signal, to connect the positive input terminal of the integral operational amplifier to the output terminal of the integral operational amplifier; and performing control, by the switch control circuit under control of the switch control signal, to connect the second electrode of the photoelectric conversion element to the positive input terminal of the integral operational amplifier, to discharge the charges in the photoelectric conversion element.

In a third aspect, embodiments of the present disclosure further provide a display device, including the above fingerprint identification and detection circuit.

DETAILED DESCRIPTION

Hereinafter, the technical solutions in embodiments of the present disclosure are described clearly and completely in conjunction with drawings in the embodiments of the present disclosure. Apparently, the described embodiments are merely a part of embodiments of the present disclosure, rather than all the embodiments of the present disclosure. All other embodiments obtained by a person of ordinary skill in the art based on the described embodiments of the present disclosure, without creative efforts, shall fall within the scope of the present disclosure.

The transistors used in all the embodiments of the present disclosure may be triodes, thin film transistors or field effect transistors or other devices with the same characteristics. In the embodiment of the present disclosure, in order to distinguish two electrodes of the transistor other than the control electrode, one of the two electrodes is referred to as a first electrode and the other electrode is referred to as a second electrode.

In actual operation, when the transistor is a triode, the control electrode may be a base electrode, the first electrode may be a collector electrode, and the second electrode may be an emitter electrode; or the control electrode may be a base electrode, the first electrode may be an emitter electrode, and the second electrode may be a collector electrode.

In actual operation, when the transistor is a thin film transistor or a field effect transistor, the control electrode may be a gate electrode, the first electrode may be a drain electrode, and the second electrode may be a source electrode; or the control electrode may be a gate electrode, the first electrode may be a source electrode, and the second electrode may be a drain electrode.

Figure 1A:
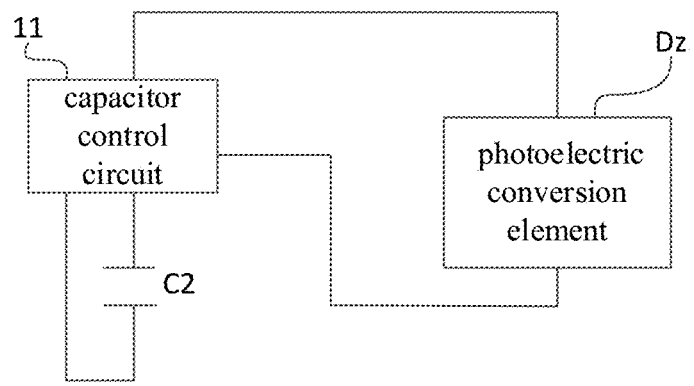
FIG. 1A is a structural diagram of a fingerprint identification and detection circuit according to at least one embodiment of the present disclosure.

As shown in FIG. 1A, the fingerprint identification and detection circuit according to at least one embodiment of the present disclosure includes a storage capacitor C2, a capacitor control circuit 11 and a photoelectric conversion element Dz; where the photoelectric conversion element Dz is configured to convert a received optical signal into a corresponding electrical signal when the photoelectric conversion element Dz is in a photoelectric conversion state; the capacitor control circuit 11 is provided between the storage capacitor C2 and the photoelectric conversion element Dz, and is configured to perform control to store at least part of the electrical signal to the storage capacitor C2 under control of a capacitor control signal.

When the fingerprint identification and detection circuit according to at least one embodiment of the present disclosure is in operation, under strong ambient light, the ambient light may affect the fingerprint identification accuracy. Under strong ambient light, in a fingerprint identification and detection stage, the photoelectric conversion element Dz is in a photoelectric conversion state, and the photoelectric conversion element Dz converts the received optical signal into a corresponding electrical signal. Under control of a capacitor control signal, the capacitor control circuit 11 performs control so that charges accumulated on the photoelectric conversion element Dz may be transferred to the storage capacitor C2, increasing the photoelectric conversion dynamic range of the photoelectric conversion element Dz, and mitigating the impact of ambient light on the accuracy of fingerprint identification.

In at least one embodiment of the present disclosure as shown in FIG. 1A, the capacitor control circuit 11 may be electrically connected to a first electrode of the photoelectric conversion element Dz, the second electrode of the photoelectric conversion element Dz, the first terminal of the storage capacitor C2 and the second terminal of the storage capacitor C2 respectively, but the present disclosure is not limited thereto.

Optionally, the fingerprint identification and detection circuit according to at least one embodiment of the present disclosure may further include a voltage supply circuit; where the voltage supply circuit is configured to provide a first bias control voltage to a first electrode of the photoelectric conversion element to control the photoelectric conversion element to be in the photoelectric conversion state, or, provide a second bias control voltage to the first electrode of the photoelectric conversion element to control the photoelectric conversion element to be in a forward biased state.

In a fingerprint identification and detection stage, the voltage supply circuit supplies a first bias control voltage to the first electrode of the photoelectric conversion element to control the photoelectric conversion element to be in a photoelectric conversion state.

In an image lag elimination stage, the voltage supply circuit provides a second bias control voltage to the first electrode of the photoelectric conversion element Dz to control the photoelectric conversion element to be in a forward biased state to discharge the charges in the photoelectric conversion element, thereby exporting all the charges in the photoelectric conversion element, so as not to affect the imaging quality of the photoelectric conversion element, and eliminate image lags.

Figure 1B:
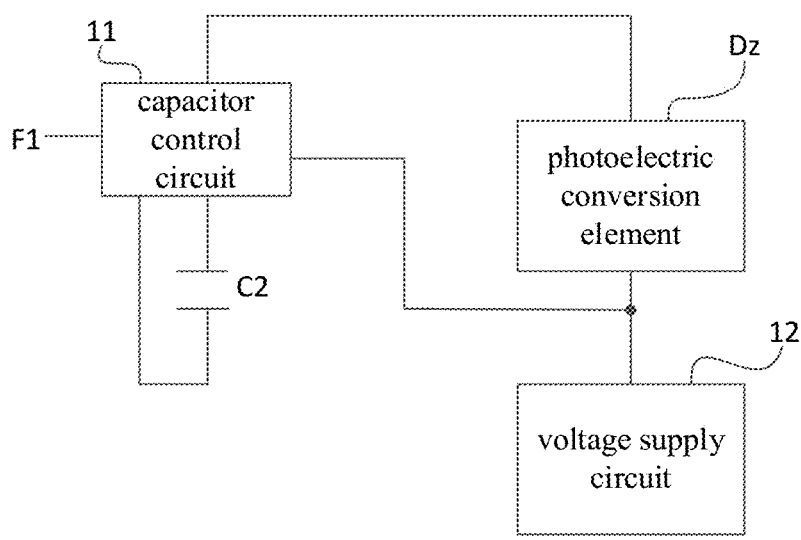
FIG. 1B is a structural diagram of a fingerprint identification and detection circuit according to at least one embodiment of the present disclosure.

As shown in FIG. 1B, the fingerprint identification and detection circuit according to at least one embodiment of the present disclosure includes a storage capacitor C2, a capacitor control circuit 11, a photoelectric conversion element Dz and a voltage supply circuit 12; where the first electrode of the photoelectric conversion element Dz is electrically connected to the voltage supply circuit 12, and the photoelectric conversion element Dz is configured to, when in the photoelectric conversion state, convert a received optical signal into a corresponding electrical signal;

the voltage supply circuit 12 is electrically connected to the first electrode of the photoelectric conversion element Dz, and is configured to provide a first bias control voltage to a first electrode of the photoelectric conversion element Dz to control the photoelectric conversion element Dz to be in the photoelectric conversion state, or, provide a second bias control voltage to the first electrode of the photoelectric conversion element Dz to control the photoelectric conversion element Dz to be in a forward biased state;

the capacitor control circuit 11 is connected electrically to a capacitor control signal terminal F 1, a first terminal of the storage capacitor C2, a second terminal of the storage capacitor C2, a first electrode of the photoelectric conversion element Dz and a second electrode of the photoelectric conversion element Dz respectively, and is configured to perform control, under control of a capacitor control signal, to connect/disconnect the first terminal of the storage capacitor C2 to/from the first electrode of the photoelectric conversion element Dz, and connect/disconnect the second terminal of the storage capacitor C2 to/from the second electrode of the photoelectric conversion element Dz;

The capacitor control signal terminal F 1 is configured to provide the capacitor control signal.

When the fingerprint identification and detection circuit according to at least one embodiment of the present disclosure is in operation, under strong ambient light, the fingerprint identification accuracy will be affect by the ambient light. Under strong ambient light, in the fingerprint identification and detection stage, the voltage supply circuit 12 provides a first bias control voltage to the first electrode of the photoelectric conversion element Dz to control the photoelectric conversion element Dz to be in a photoelectric conversion state, the photoelectric conversion element Dz converts the received optical signal into a corresponding electrical signal. The capacitor control circuit 11 performs control, under control of a capacitor control signal, to connect the first terminal of the storage capacitor C2 to the first electrode of the photoelectric conversion element Dz, and connect the second terminal of the storage capacitor C2 to the second electrode of the photoelectric conversion element Dz, so that charges accumulated on the photoelectric conversion element Dz can be transferred to the storage capacitor C2, thereby increasing the photoelectric conversion dynamic range of the photoelectric conversion element Dz, and mitigating the impact of ambient light on the accuracy of fingerprint identification.

In specific implementation, under strong ambient light, the fingerprint identification and detection stage may include a reset period, an integration period and an acquisition period arranged sequentially.

In the reset period, the second electrode of the photoelectric conversion element Dz is controlled to be fed with a reference voltage;

In the integration period, the photoelectric conversion element Dz converts a received optical signal into a corresponding electrical signal, and the storage capacitor C2 is charged with the electrical signal to change a voltage at the second electrode of the photoelectric conversion element;

In the acquisition period, fingerprint identification may be performed based on the voltage at the second electrode of the photoelectric conversion element.

When the fingerprint identification and detection circuit according to at least one embodiment of the present disclosure is in operation, under weak ambient light, since the ambient light has little effect on the fingerprint identification accuracy, there is no need to increase the control system capacitance. In the fingerprint identification and detection stage, the capacitor control circuit performs control, under control of the capacitor control signal, to disconnect a first terminal of a storage capacitor from the first electrode of the photoelectric conversion element, and disconnect a second terminal of a storage capacitor from a second electrode of the photoelectric conversion element; the voltage supply circuit provides a first bias control voltage to the first electrode of the photoelectric conversion element to control the photoelectric conversion element to be in a photoelectric conversion state;

the fingerprint identification and detection stage includes a reset period, an integration period and an acquisition period arranged sequentially;

in the reset period, the second electrode of the photoelectric conversion element is controlled to be fed with a reference voltage;

in the integration period, the photoelectric conversion element converts a received optical signal into a corresponding electrical signal, and the storage capacitor is charged with the electrical signal to change a voltage at the second electrode of the photoelectric conversion element;

in the acquisition period, fingerprint identification may be performed based on the voltage at the second electrode of the photoelectric conversion element.

Under strong ambient light, the photoelectric conversion element Dz is susceptible to saturation by strong light, so a storage capacitor C2 is employed to store charges in the photoelectric conversion element Dz, to avoid a situation that the photoelectric conversion element Dz saturates due to excessive ambient light, and thereby no valid fingerprint valley-ridge information can be collected. When the fingerprint identification and detection circuit described in at least one embodiment of the present disclosure is in operation, the storage capacitor C2 can be added under strong ambient light, so that the charges in the photoelectric conversion element Dz can be transferred to the storage capacitor C2, increasing the photoelectric conversion dynamic range of the photoelectric conversion element Dz and eliminating the impact of ambient light on fingerprint information under strong ambient light.

In the related art, when fingerprint identification is performed under strong ambient light, such as outdoors, especially in summer when the sunlight is very strong, the sunlight can still penetrate the finger to reach the photoelectric conversion element Dz, thereby saturating the photoelectric conversion element Dz and affecting the fingerprint imaging quality. In this case, in order to prevent the photoelectric conversion element Dz from being saturated, the integration time can be reduced. However, if the integration time is reduced, the electrical signal (which is electrical signal effective for fingerprint identification) converted from the effective light emitted by an OLED (organic light-emitting diode) will be reduced, so the integration time cannot be reduced without limit. But with the time moving on and due to the problem of residual charges in the photoelectric conversion element Dz itself, the photoelectric conversion element Dz will still be saturated. Consequently, a storage capacitor C2 is employed in at least one embodiment of the present disclosure to increase the control system capacitance, so as to increase the dynamic measurement range of the photoelectric conversion element Dz, so that the photoelectric conversion element Dz is not easily saturated, and the photoelectric conversion element Dz can collect valid fingerprint valley-ridge information, thereby improving the fingerprint imaging quality.

Optionally, the fingerprint identification and detection circuit according to at least one embodiment of the present disclosure may further include a switch control circuit and a discharge voltage terminal; where the switch control circuit is configured to perform control to connect electrically a second electrode of the photoelectric conversion element to the discharge voltage terminal under control of a switch control signal, to discharge charges in the photoelectric conversion element to the discharge voltage terminal.

Figure 2A:
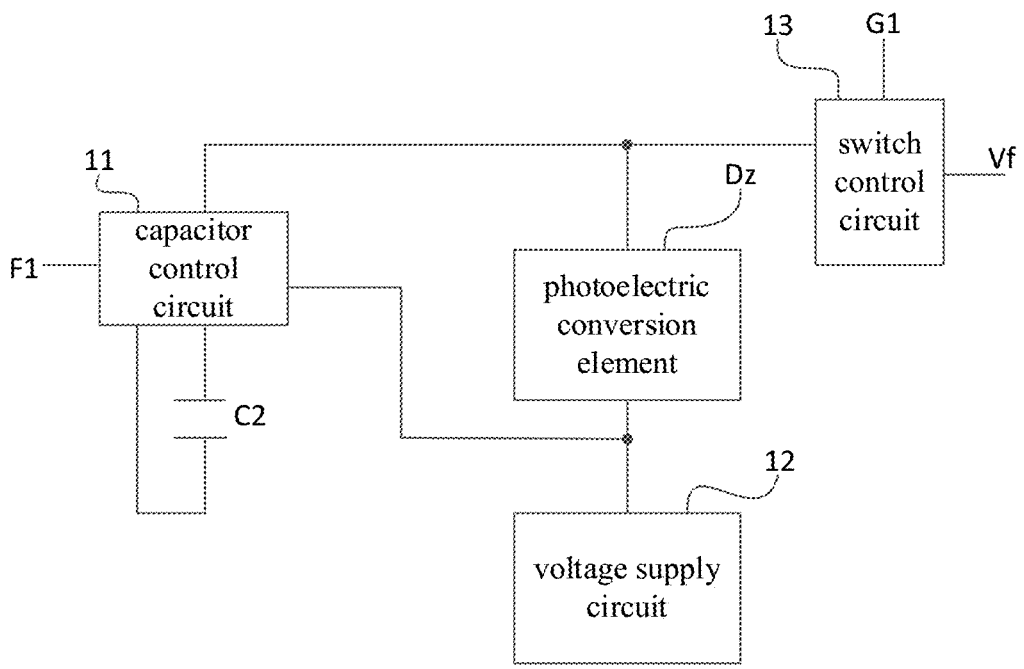
FIG. 2A is a structural diagram of a fingerprint identification and detection circuit according to at least one embodiment of the present disclosure.

As shown in FIG. 2A, based on at least one embodiment of the fingerprint identification and detection circuit as shown in FIG. 1B, the fingerprint identification and detection circuit according to at least one embodiment of the present disclosure may further include a switch control circuit 13 and a discharge voltage terminal Vf, where the switch control circuit 13 is configured to perform control to connect electrically a second electrode of the photoelectric conversion element Dz to the discharge voltage terminal Vf under control of a switch control signal provided by a switch control terminal G1, to discharge charges in the photoelectric conversion element Dz to the discharge voltage terminal Vf.

Optionally, the fingerprint identification and detection circuit according to at least one embodiment of the present disclosure may further include a switch control circuit 13 and a discharge voltage terminal. In an image lag elimination stage, under control of the capacitor control signal, the capacitor control circuit 11 performs control to disconnect the first terminal of the storage capacitor C2 from the first electrode of the photoelectric conversion element Dz, and disconnect the second terminal of the storage capacitor C2 from the second electrode of the photoelectric conversion element Dz. The voltage supply circuit 12 provides a second bias control voltage to the first electrode of the photoelectric conversion element Dz to control the photoelectric conversion element to be in a forward biased state; the switch control circuit 13 performs control to connect electrically the second electrode of the photoelectric conversion element Dz to the discharge voltage terminal Vf under control of the switch control signal provided by the switch control terminal G1, to discharge charges in the photoelectric conversion element Dz to the discharge voltage terminal Vf, so that all charges in the photoelectric conversion element Dz can be transferred away in the image lag elimination stage and there will be no electric charge remaining in the photoelectric conversion element Dz, thereby not affecting the imaging quality of the photoelectric conversion element Dz.

In at least one embodiment of the present disclosure, the image lag elimination stage may be arranged after the fingerprint identification and detection stage, but the present disclosure is not limited thereto.

In the related art, under weak ambient light, such as indoors, due to the manufacturing process and materials of the photoelectric conversion element Dz, there will be defects on the surface. Such defects will cause the photoelectric conversion element Dz to release the accumulated photo-charges slowly, leading to an image lag. During a fixed period of time, if the photo-charges in the photoelectric conversion element Dz cannot be fully transferred away, as time moves on, the photoelectric conversion element Dz tends to saturate, thereby affecting the collection of fingerprint signals by the photoelectric conversion element Dz. Under strong ambient light, such as outdoors, especially in summer when the sunlight is very strong, if the integration time is short, the strong ambient light makes the photoelectric conversion element Dz to generate too many photo-charges. If the photo-charges cannot be transferred away within an effective time, they will gradually accumulate, causing the photoelectric conversion element Dz to saturate; if the integration time is long, strong ambient light will directly saturate the photoelectric conversion element Dz, so that the fingerprint valley-ridge information cannot be collected effectively.

In at least one embodiment of the present disclosure, image lag is eliminated by redesigning the fingerprint identification and detection circuit. When the fingerprint identification and detection circuit according to at least one embodiment of the present disclosure is in operation, during normal optical fingerprint identification, the photoelectric conversion element Dz is in the photoelectric conversion state, and during image lag elimination, the photoelectric conversion element Dz is in a forward biased state to discharge electric charges accumulated on the photoelectric conversion element Dz, thereby eliminating the image lag.

In at least one embodiment of the present disclosure, the photoelectric conversion element Dz may be a photodiode, the first electrode of the photoelectric conversion element Dz is an anode of the photodiode, and the second electrode of the photoelectric conversion element Dz is a cathode of the photodiode. During normal optical fingerprint identification, that is, during the fingerprint identification and detection stage, the photodiode is in a backward biased state to enable photoelectric conversion to convert the received optical signal into a corresponding current signal; during image lag elimination, that is, in an image lag elimination stage, the photodiode is in a forward biased state so that photo-charges in the photodiode can be discharged, to eliminate the image lag.

In at least one embodiment of the present disclosure, the photoelectric conversion element may also be any other device capable of performing photoelectric conversion.

In at least one embodiment of the present disclosure, the first bias control voltage may be a negative voltage, and the second bias control voltage may be a positive voltage, but the present disclosure is not limited thereto.

Specifically, the fingerprint identification and detection circuit according to at least one embodiment of the present disclosure may further include a reset circuit; the reset circuit is configured to provide a reset voltage to the second electrode of the photoelectric conversion element.

In a specific implementation, the fingerprint identification and detection stage may include a reset period, an integration period and an acquisition period arranged sequentially. In the reset period, the reset circuit provides a reset voltage to the second electrode of the photoelectric conversion element, so as to ensure that the charges collected by each row of fingerprint identification and detection circuits (the display device may include multiple rows and columns of fingerprint identification and detection circuits) are integrated from the same potential.

Figure 2B:
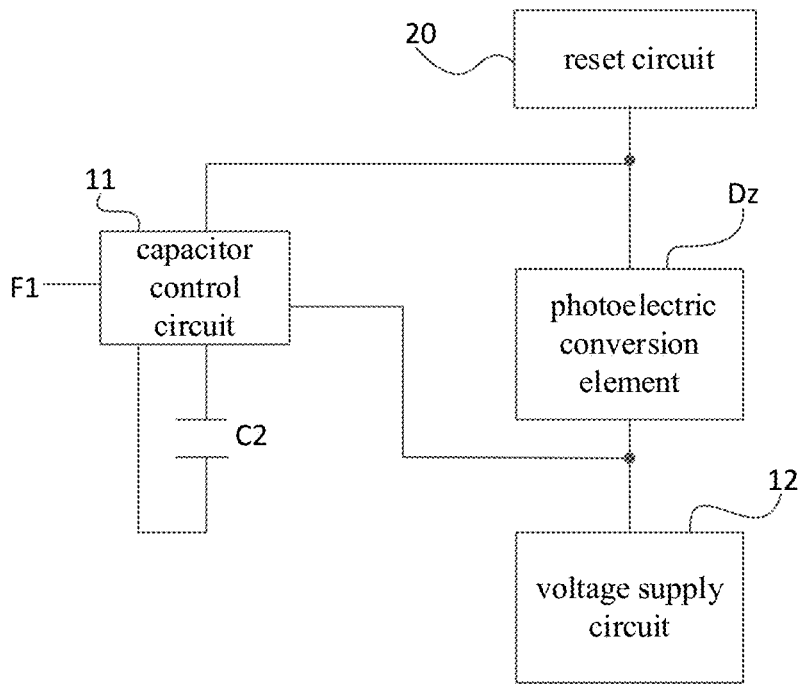
FIG. 2B is a structural diagram of a fingerprint identification and detection circuit according to at least one embodiment of the present disclosure.

As shown in FIG. 2B, on the basis of at least one embodiment of the fingerprint identification and detection circuit as shown in FIG. 1B, the fingerprint identification and detection circuit according to at least one embodiment of the present disclosure further includes a reset circuit 20;

the reset circuit 20 is electrically connected to the second electrode of the photoelectric conversion element Dz, and is configured to provide a reset voltage to the second electrode of the photoelectric conversion element Dz.

Specifically, the capacitor control circuit may include a first capacitor control transistor and a second capacitor control transistor;

the capacitor control signal includes a first capacitor control signal and a second capacitor control signal;

a control electrode of the first capacitor control transistor is electrically connected to a first capacitor control signal line, a first electrode of the first capacitor control transistor is electrically connected to a first terminal of the storage capacitor, and a second electrode of the first capacitor control transistor is electrically connected to the first electrode of the photoelectric conversion element;

a control electrode of the second capacitor control transistor is electrically connected to a second capacitor control signal line, a first electrode of the second capacitor control transistor is electrically connected to the second electrode of the photoelectric conversion element, and a second electrode of the second capacitor control transistor is electrically connected to the second terminal of the storage capacitor;

the first capacitor control signal line is configured to provide the first capacitor control signal, and the second capacitor control signal line is configured to provide the second capacitor control signal.

In at least one embodiment of the present disclosure, the first capacitor control signal may be the same as the second capacitor control signal, or the first capacitor control signal may be different from the second capacitor control signal.

Figure 3:
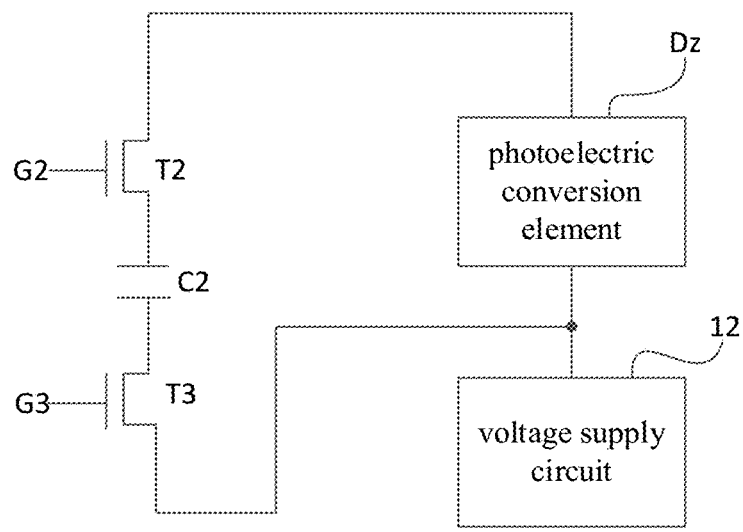
FIG. 3 is a structural diagram of a fingerprint identification and detection circuit according to at least one embodiment of the present disclosure.

As shown in FIG. 3, on the basis of at least one embodiment of the fingerprint identification and detection circuit as shown in FIG. 1B, the capacitor control circuit may include a first capacitor control transistor T3 and a second capacitor control transistor T2;

the capacitor control signal includes a first capacitor control signal and a second capacitor control signal;

a gate electrode of the first capacitor control transistor T3 is electrically connected to a first capacitor control signal line G3, a drain electrode of the first capacitor control transistor T3 is electrically connected to a first terminal of the storage capacitor C2, and a source electrode of the first capacitor control transistor T3 is electrically connected to the first electrode of the photoelectric conversion element Dz;

a gate electrode of the second capacitor control transistor T2 is electrically connected to a second capacitor control signal line G2, a drain electrode of the second capacitor control transistor T2 is electrically connected to the second electrode of the photoelectric conversion element Dz, and a source electrode of the second capacitor control transistor T2 is electrically connected to the second terminal of the storage capacitor C2;

the first capacitor control signal line G3 is configured to provide the first capacitor control signal, and the second capacitor control signal line G2 is configured to provide the second capacitor control signal.

In at least one embodiment as shown in FIG. 3, both T3 and T2 are n-type thin film transistors, but the present disclosure is not limited thereto.

When at least one embodiment of the fingerprint identification and detection circuit of the present disclosure as shown in FIG. 3 is in operation, under strong ambient light, T2 and T3 are turned on in the fingerprint identification and detection stage to store photo-charges in Dz with C2, T2 and T3 are turned off in an image lag elimination stage; and under weak ambient light, T2 and T3 are turned off in the fingerprint identification and detection stage and the image lag elimination stage.

According to a specific implementation, the voltage supply circuit may include a first voltage supply transistor and a second voltage supply transistor; where a control electrode of the first voltage supply transistor is electrically connected to a first voltage supply control line, a first electrode of the first voltage supply transistor is electrically connected to a first bias control voltage terminal, and a second electrode of the first voltage supply transistor is electrically connected to the first electrode of the photoelectric conversion element;

a control electrode of the second voltage supply transistor is electrically connected to a second voltage supply control line, a first electrode of the second voltage supply transistor is electrically connected to a second bias control voltage terminal, and a second electrode of the second voltage supply transistor is electrically connected to the first electrode of the photoelectric conversion element;

the first bias control voltage terminal is configured to provide the first bias control voltage, and the second bias control voltage terminal is configured to provide the second bias control voltage.

Figure 4A:
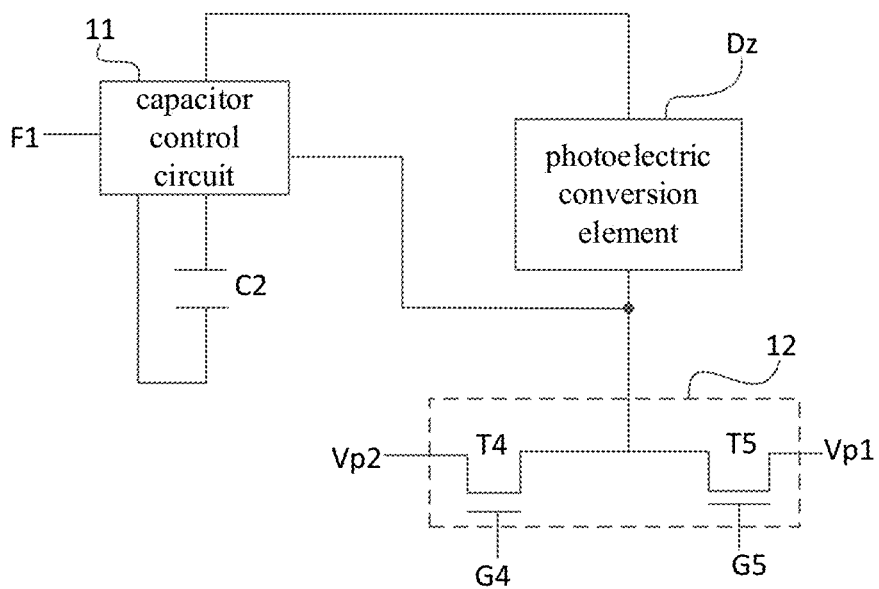
FIG. 4A is a structural diagram of a fingerprint identification and detection circuit according to at least one embodiment of the present disclosure.

As shown in FIG. 4A, on the basis of at least one embodiment of the fingerprint identification and detection circuit as shown in FIG. 1B, the voltage supply circuit 12 may include a first voltage supply transistor T5 and a second voltage supply transistor T4; where a gate electrode of the first voltage supply transistor T5 is electrically connected to a first voltage supply control line G5, a drain electrode of the first voltage supply transistor T5 is electrically connected to a first bias control voltage terminal Vp1, and a source electrode of the first voltage supply transistor T5 is electrically connected to the first electrode of the photoelectric conversion element Dz;

a gate electrode of the second voltage supply transistor T4 is electrically connected to a second voltage supply control line G4, a drain electrode of the second voltage supply transistor T4 is electrically connected to a second bias control voltage terminal Vp2, and a source electrode of the second voltage supply transistor T4 is electrically connected to the first electrode of the photoelectric conversion element Dz;

the first bias control voltage terminal Vp1 is configured to provide the first bias control voltage, and the second bias control voltage terminal Vp2 is configured to provide the second bias control voltage.

In at least one embodiment as shown in FIG. 4A, both T5 and T4 are n-type thin film transistors, but the present disclosure is not limited thereto.

When at least one embodiment of the fingerprint identification and detection circuit of the present disclosure as shown in FIG. 4A is in operation, T5 is turned on and T4 is turned off during the fingerprint identification and detection stage, to control Dz to be in the photoelectric conversion state; T5 is turned off and T4 is turned on in the image lag elimination stage, to control Dz to be in a forward biased state.

According to another specific implementation, the voltage supply circuit may include a bias control voltage terminal and a bias control voltage supply circuit; where the bias control voltage terminal is electrically connected to the first electrode of the photoelectric conversion element, and the bias control voltage supply circuit is configured to supply the first bias control voltage or the second bias control voltage to the bias control voltage terminal.

Figure 4B:
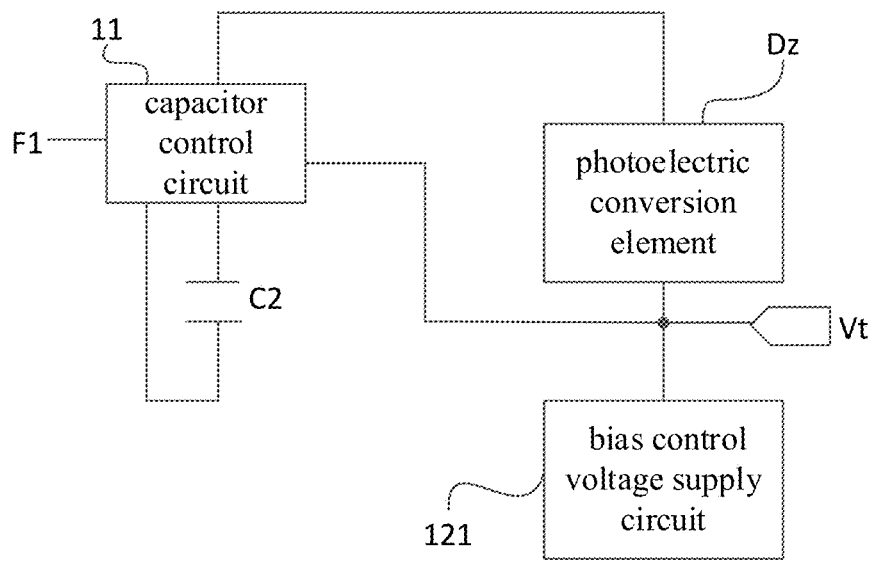
FIG. 4B is a structural diagram of a fingerprint identification and detection circuit according to at least one embodiment of the present disclosure.

As shown in FIG. 4B, on the basis of at least one embodiment of the fingerprint identification and detection circuit as shown in FIG. 1B, the voltage supply circuit includes a bias control voltage terminal Vt and a bias control voltage supply circuit 121;

the bias control voltage terminal Vt is electrically connected to the first electrode of the photoelectric conversion element, and the bias control voltage supply circuit 121 is configured to supply the first bias control voltage or the second bias control voltage to the bias control voltage terminal Vt.

In at least one embodiment of the present disclosure, the fingerprint identification and detection circuit may further include a switch control circuit, an integral operational amplifier, an integrating capacitor and a discharge switch;

the switch control circuit is electrically connected to a switch control terminal, the second electrode of the photoelectric conversion element, and a positive input terminal of the integral operational amplifier, respectively, and is configured to perform control to connect/disconnect the second electrode of the photoelectric conversion element to/from the positive input terminal of the integral operational amplifier under control of a switch control signal provided by the switch control terminal;

a negative input terminal of the integral operational amplifier is electrically connected to a reference voltage terminal;

a first terminal of the integrating capacitor is electrically connected to the positive input terminal of the integral operational amplifier, and a second terminal of the integrating capacitor is electrically connected to an output terminal of the integral operational amplifier;

a control terminal of the discharge switch is electrically connected to a discharge control terminal, a first terminal of the discharge switch is electrically connected to the positive input terminal of the integral operational amplifier, and a second terminal of the discharge switch is electrically connected to the output terminal of the integral operational amplifier, and the discharge switch is configured to perform control to connect/disconnect the positive input terminal of the integral operational amplifier to/from the output terminal of the integral operational amplifier under control of a discharge control signal provided by the discharge control terminal.

In specific implementation, the fingerprint identification and detection circuit according to at least one embodiment of the present disclosure may further include a switch control circuit, an integral operational amplifier, an integrating capacitor and a discharge switch. The reset, acquisition and discharge can be realized by controlling the switch control circuit and the discharge switch.

Figure 5:
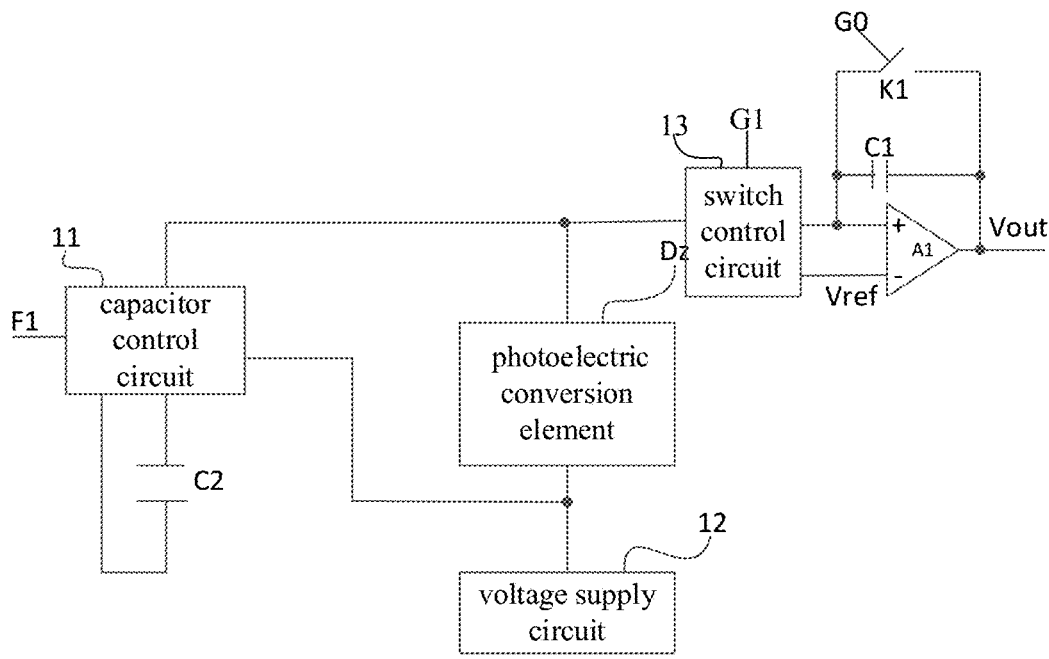
FIG. 5 is a structural diagram of a fingerprint identification and detection circuit according to at least one embodiment of the present disclosure.

As shown in FIG. 5, on the basis of at least one embodiment of the fingerprint identification and detection circuit as shown in FIG. 1B, the fingerprint identification and detection circuit according to at least one embodiment of the present disclosure may further include a switch control circuit 13, an integral operational amplifier A1, an integrating capacitor C1, and a discharge switch K1, where the switch control circuit 13 is electrically connected to a switch control terminal G1, the second electrode of the photoelectric conversion element Dz, and a positive input terminal of the integral operational amplifier A1, respectively, and is configured to perform control to connect/disconnect the second electrode of the photoelectric conversion element Dz to/from the positive input terminal of the integral operational amplifier A1 under control of the switch control signal provided by the switch control terminal G1;

a negative input terminal of the integral operational amplifier A1 is electrically connected to a reference voltage terminal; the reference voltage terminal is configured to provide a reference voltage Vref;

a first terminal of the integrating capacitor C1 is electrically connected to the positive input terminal of the integral operational amplifier A1, and a second terminal of the integrating capacitor C1 is electrically connected to an output terminal Vout of the integral operational amplifier A1;

a control terminal of the discharge switch K1 is electrically connected to a discharge control terminal G0, a first terminal of the discharge switch K1 is electrically connected to the positive input terminal of the integral operational amplifier A1, and a second terminal of the discharge switch K1 is electrically connected to the output terminal Vout of the integral operational amplifier A1, and the discharge switch K1 is configured to perform control to connect/disconnect the positive input terminal of the integral operational amplifier A1 to/from the output terminal Vout of the integral operational amplifier A1 under control of a discharge control signal provided by the discharge control terminal G0.

When at least one embodiment of the fingerprint identification and detection circuit of the present disclosure as shown in FIG. 5 is in operation, the fingerprint identification and detection stage may include a reset period, an integration period, and an acquisition period arranged sequentially.

During the reset phase, K1 is turned off and T1 is turned on, to connect the second electrode of the photoelectric conversion element Dz to the positive input terminal of A1. Since it is virtual short between the positive input terminal of A1 and the negative input terminal of A1, the second electrode of Dz is fed with Vref;

during the integration period, both K1 and T1 are turned off;

during the acquisition period, K1 is turned off and T1 is turned on, to pass charges (under strong ambient light, the charges are charges in C2 and Dz; and under weak ambient light, the charges are charges in Dz) to the integrating capacitor, so as to change the voltage at the output terminal Vout of A1, so that fingerprint identification can be performed according to the voltage at the output terminal Vout of A1; and during the image lag elimination stage, K1 is turned on and T1 is turned on, so that the residual charges in Dz can be discharged to Vout through the turned-on T1 and K1, thereby eliminating the image lag.

Specifically, the switch control circuit may include a switch control transistor; where a control electrode of the switch control transistor is electrically connected to the switch control terminal, a first electrode of the switch control transistor is electrically connected to the second electrode of the photoelectric conversion element, and a second electrode of the switch control transistor is electrically connected to the positive input terminal of the integral operational amplifier.

In at least one embodiment of the present disclosure, the fingerprint identification and detection circuit may further include an ambient light intensity detection circuit; where the ambient light intensity detection circuit is configured to detect intensity of ambient light and control the capacitor control signal according to the intensity.

According to the intensity of the ambient light detected by the ambient light intensity detection circuit, it can be determined whether the fingerprint identification and detection circuit is under strong ambient light or weak ambient light, so that corresponding control timing can be adopted.

Figure 6:
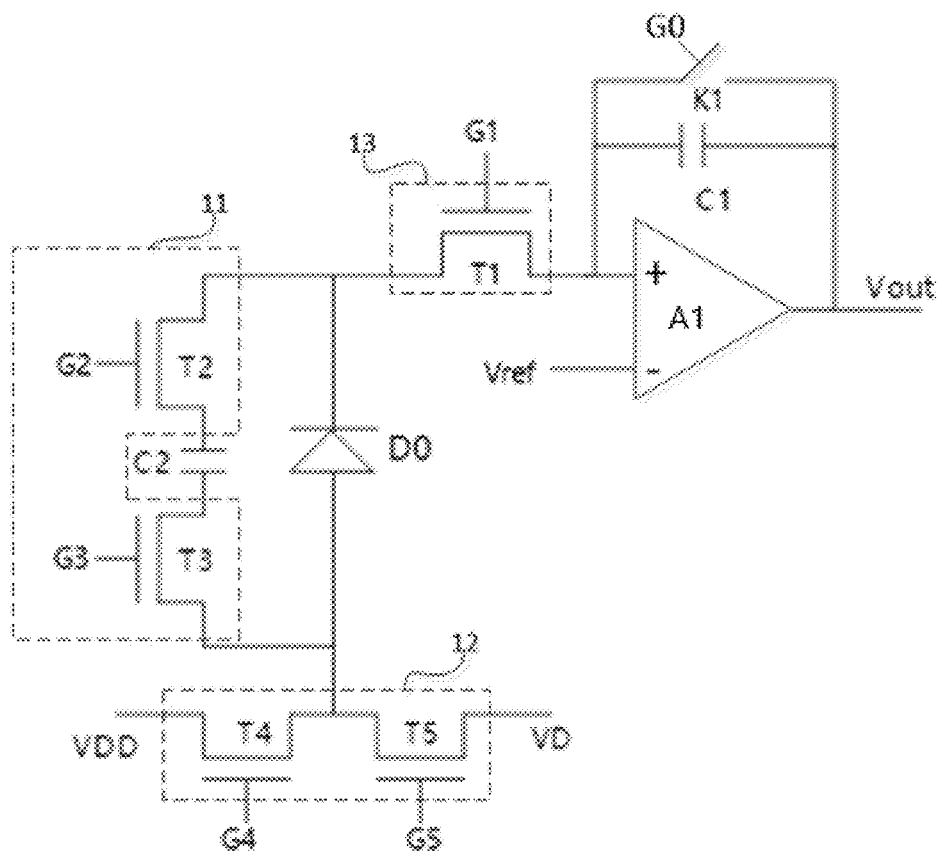
FIG. 6 is a circuit diagram of a fingerprint identification and detection circuit according to at least one embodiment of the present disclosure.

As shown in FIG. 6, at least one embodiment of the fingerprint identification and detection circuit of the present disclosure includes a storage capacitor C2, a capacitor control circuit 11, a photodiode D0, a voltage supply circuit 12, a switch control circuit 13, an integral operational amplifier A1, an integration capacitor C1 and a discharge switch K1, where the capacitor control circuit 11 includes a first capacitor control transistor T3 and a second capacitor control transistor T2; the capacitor control signal includes a first capacitor control signal and a second capacitor control signal;

a gate electrode of the first capacitor control transistor T3 is electrically connected to a first capacitor control signal line G3, a drain electrode of the first capacitor control transistor T3 is electrically connected to a first terminal of the storage capacitor C2, and a source electrode of the first capacitor control transistor T3 is electrically connected to an anode of the photodiode D0;

a gate electrode of the second capacitor control transistor T2 is electrically connected to a second capacitor control signal line G2, a drain electrode of the second capacitor control transistor T2 is electrically connected to a cathode of the photodiode D0, and a source electrode of the second capacitor control transistor T2 is electrically connected to the second terminal of the storage capacitor C2;

the first capacitor control signal line G3 is configured to provide the first capacitor control signal, and the second capacitor control signal line G2 is configured to provide the second capacitor control signal;

the voltage supply circuit 12 includes a first voltage supply transistor T5 and a second voltage supply transistor T4, where a gate electrode of the first voltage supply transistor T5 is electrically connected to a first voltage supply control line G5, a drain electrode of the first voltage supply transistor T5 is fed with a negative voltage VD, and a source electrode of the first voltage supply transistor T5 is electrically connected to the anode of the photodiode D0;

a gate electrode of the second voltage supply transistor T4 is electrically connected to a second voltage supply control line G4, a drain electrode of the second voltage supply transistor T4 is fed with a positive voltage VDD, and a source electrode of the second voltage supply transistor T4 is electrically connected to the anode of the photodiode D0;

the switch control circuit 13 includes a switch control transistor T1; where a gate electrode of the switch control transistor T1 is electrically connected to the switch control terminal G1, a drain electrode of the switch control transistor T1 is electrically connected to the cathode of the photodiode D0, and a source electrode of the switch control transistor T1 is electrically connected to the positive input terminal of the integral operational amplifier A1;

a negative input terminal of the integral operational amplifier A1 is electrically connected to a reference voltage terminal; the reference voltage terminal is configured to provide a reference voltage Vref;

a first terminal of the integrating capacitor C1 is electrically connected to the positive input terminal of the integral operational amplifier A1, and a second terminal of the integrating capacitor C1 is electrically connected to an output terminal Vout of the integral operational amplifier A1;

a control terminal of the discharge switch K1 is electrically connected to a discharge control terminal G0, a first terminal of the discharge switch K1 is electrically connected to the positive input terminal of the integral operational amplifier A1, and a second terminal of the discharge switch K1 is electrically connected to the output terminal Vout of the integral operational amplifier A1, and the discharge switch K1 is configured to perform control to connect/disconnect the positive input terminal of the integral operational amplifier A1 to/from the output terminal Vout of the integral operational amplifier A1 under control of a discharge control signal provided by the discharge control terminal G0.

In at least one embodiment of the present disclosure, VD may be greater than or equal to −8V and less than or equal to −3V, VDD may be greater than or equal to 2V and less than or equal to 10V, and Vref may be greater than or equal to 1V and less than or equal to 2V, but the present disclosure is not limited thereto.

In at least one embodiment as shown in FIG. 6, all the transistors are n-type thin film transistors, but the present disclosure is not limited thereto.

In at least one embodiment as shown in FIG. 6, the first bias control voltage is VD, and the second bias control voltage is VDD, but the present disclosure is not limited thereto.

Figure 7:
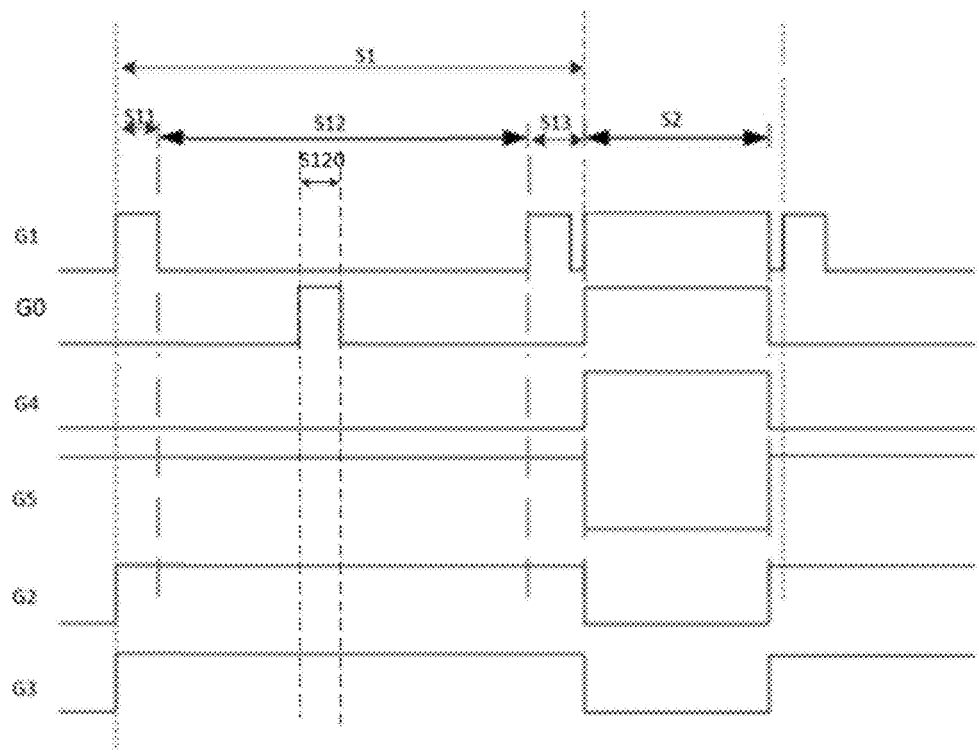
FIG. 7 is an operation timing diagram of a first specific example of a fingerprint identification and detection circuit, when under strong ambient light, according to at least one embodiment of the present disclosure as shown in FIG. 6.

As shown in FIG. 7, when the fingerprint identification and detection circuit as shown in FIG. 6 is in operation under strong ambient light, one frame of time may include a fingerprint identification and detection stage S1 and an image lag elimination stage S2 that are arranged sequentially, where the fingerprint identification and detection stage S1 includes a reset period S11, an integration period S12 and an acquisition period S13 arranged sequentially;

the integration period S12 includes an integral reset sub-period S120;

in the integral reset sub-period S120, the discharge switch K1, under control of the discharge control terminal G0, switches on a connection between the positive input terminal of A1 and the output terminal Vout of A1, and is configured to reset the integral operational amplifier; in a period included in the fingerprint identification and detection stage S1 other than the integral reset sub-period S120, the discharge switch K1, under control of the discharge control terminal G0, switches off the connection between the positive input terminal of A1 and the output terminal Vout of A1;

in the fingerprint identification and detection stage S1, a low level is inputted from G4, T4 is turned off, a high level is inputted from G5, and T5 is turned on, the anode of D0 is fed with VD, D0 is backward biased, D0 is in the photoelectric conversion state and converts the received optical signal into a current signal; a high level is inputted from both G2 and G3, and T2 and T3 are both turned on;

during the reset period S11, a high level is inputted from G1, T1 is turned on. Since A1 is virtual short, the cathode of D0 is fed with Vref, which can ensure that charges collected by each row of fingerprint identification and detection circuits are integrated from the same potential;

during the integration period S12, a low level is inputted from G1, T1 is turned off. D0 converts the received optical signal into a current signal to charge C2, while photo-charges are accumulated on D0. As the integration process progresses, D0 has a decreased cathode voltage after being exposed to light;

during the acquisition period S13, a high level is inputted from G1, T1 is turned on, and the photo-charges accumulated on D0 are transferred to C1 to realize the integration function, and the voltage outputted by Vout is changed accordingly, and fingerprint identification can be performed according to the voltage.

After the optical fingerprint collection is completed, T2 and T3 are turned off, so that C2 is disabled; the photodiode D0 may have defects on its surface due to the manufacturing process. Such defects may cause D0 to release the accumulated photo-charges slowly, thereby causing image lag. In the acquisition period of the next frame of time, the residual charges of the previous frame on D0 will be collected, so the residual charges on D0 should be flushed out;

In the image lag elimination stage S2, a high level is inputted from G1, a high level is inputted from G4, and a low level is inputted from G5, G2 and G3, the discharge switch K1, under control of the discharge control terminal G0, performs control to connect the positive input terminal of A1 to the output terminal Vout of A1, the anode of D0 is fed with VDD, D0 is in a forward biased state. VDD is passed to the anode of D0 through T4. The residual charges on D0 are transferred to the subsequent circuit to be released, thereby completing the image lag elimination. The capacitor does not require the image lag elimination operation, and can directly discharge the charges within.

In at least one embodiment of the present disclosure, the duration of the integration period S12 generally ranges from tens of milliseconds to hundreds of milliseconds, but the present disclosure is not limited thereto.

Figure 8:
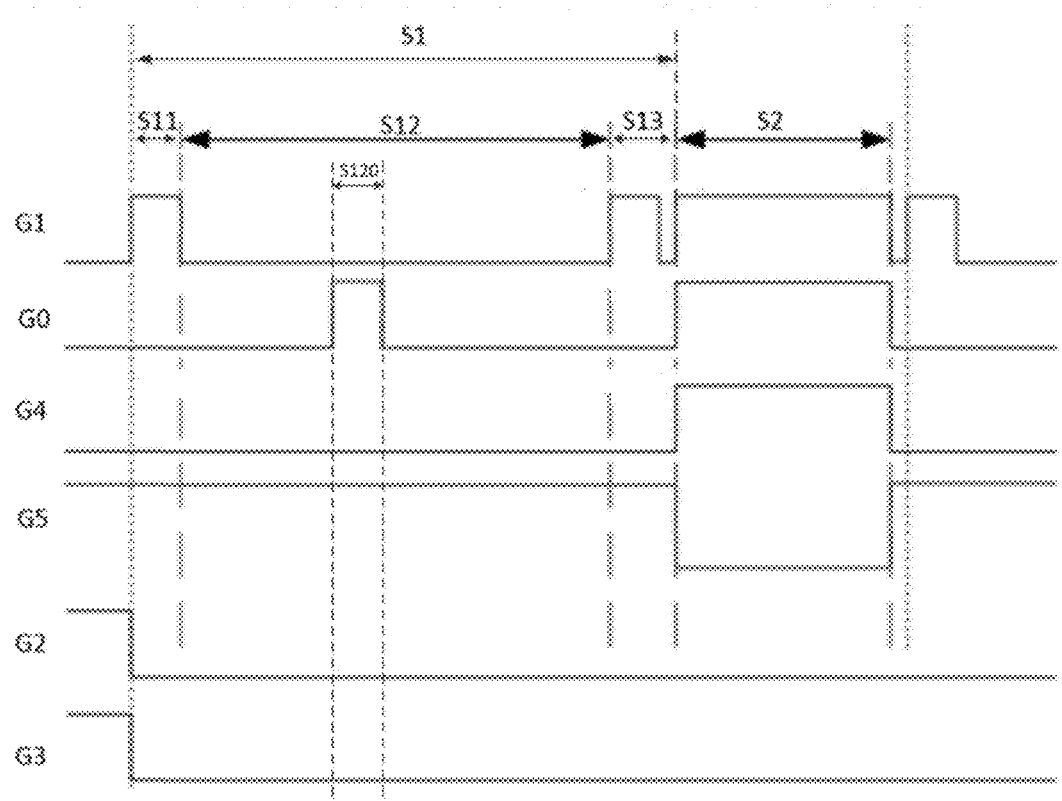
FIG. 8 is an operation timing diagram of a first specific example of a fingerprint identification and detection circuit, when under weak ambient light, according to at least one embodiment of the present disclosure as shown in FIG. 6.

As shown in FIG. 8, when the fingerprint identification and detection circuit as shown in FIG. 6 operates under weak ambient light, one frame of time may include a fingerprint identification and detection stage S1 and an image lag elimination stage S2 that are arranged sequentially, where the fingerprint identification and detection stage S1 includes a reset period S11, an integration period S12 and an acquisition period S13 arranged sequentially.

In the fingerprint identification and detection stage S1 and the image lag elimination stage S2, a low level is inputted from both G2 and G3, T2 and T3 are turned off. That is, since somewhat less strong light generally does not saturate D0, C2 is disabled under weak ambient light, but it is still necessary to eliminate the image lag of D0.

The integration period S12 includes an integral reset sub-period S120.

In the integral reset sub-period S120, under control of the discharge control terminal G0, the discharge switch K1 switches on the connection between the positive input terminal of A1 and the output terminal Vout of A1, and is configured to reset the integral operational amplifier.

During a period included in the fingerprint identification and detection stage S1 other than the integration reset sub-period S120, the discharge switch K1, under control of the discharge control terminal G0, switches off the connection between the positive input terminal of A1 and the output terminal Vout of A1.

In the fingerprint identification and detection stage S1, a low level is inputted from G4, T4 is turned off, a high level is inputted from G5, T5 is turned on. The anode of D0 is fed with VD, D0 is backward biased. D0 is in the photoelectric conversion state, and converts the received optical signal into a current signal.

In the reset period S11, a high level is inputted from G1, and T1 is turned on. Because A1 is virtual short, the cathode of D0 is fed with Vref, which can ensure that the collected charges of each row are integrated from the same potential.

During the integration period S12, a low level is inputted from G1, T1 is turned off. D0 converts the received optical signal into a current signal to charge C2, while photo-charges are accumulated on D0. As the integration process progresses, D0 has a decreased cathode voltage after being exposed to light.

During the acquisition period S13, a high level is inputted from G1, T1 is turned on, and the photo-charges accumulated on D0 are transferred to C1 to realize the integration function, and the voltage outputted by Vout is changed accordingly. Fingerprint identification can be performed according to the voltage.

Due to the manufacturing process of the photodiode D0, the photodiode D0 may have defects on its surface. Such defects may cause D0 to release the accumulated photo-charges slowly, causing image lags. In the acquisition period of the next frame of time, the residual charges of the previous frame on D0 will be collected, so the residual charges on D0 should be flushed out.

In the image lag elimination stage S2, a high level is inputted from G1, a high level is inputted from G4, and a low level is inputted from G5. The discharge switch K1 performs control to connect the positive input terminal of A1 to the output terminal Vout of A1 under control of the discharge control terminal G0. The anode of D0 is fed with VDD, and D0 is in a forward-biased state. VDD is passed to the anode of D0 through T4. The residual charges on D0 is transferred to the subsequent circuit to be released, thereby completing the image lag elimination operation. The capacitor does not require the image lag elimination operation, and can directly discharge the charges within.

Figure 9:
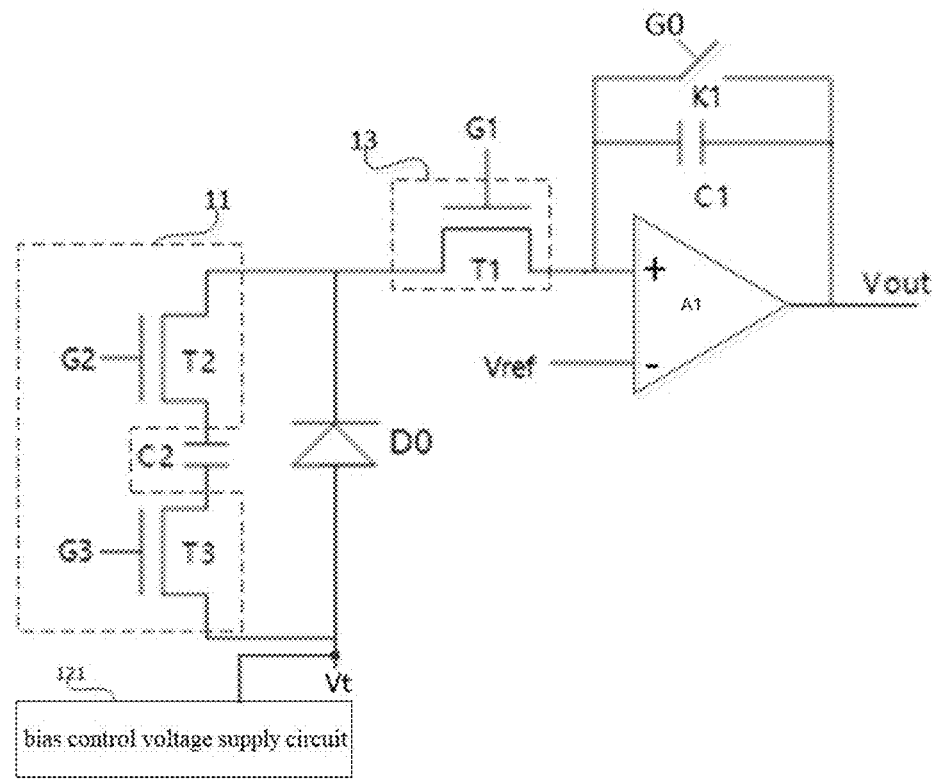
FIG. 9 is a circuit diagram of a fingerprint identification and detection circuit according to at least one embodiment of the present disclosure.

As shown in FIG. 9, at least one embodiment of the fingerprint identification and detection circuit of the present disclosure includes a storage capacitor C2, a capacitor control circuit 11, a photodiode D0, a voltage supply circuit, a switch control circuit 13, an integral operational amplifier A1, an integration capacitor C1 and a discharge switch K1, where the capacitor control circuit 11 includes a first capacitor control transistor T3 and a second capacitor control transistor T2; the capacitor control signal includes a first capacitor control signal and a second capacitor control signal;

a gate electrode of the first capacitor control transistor T3 is electrically connected to a first capacitor control signal line G3, a drain electrode of the first capacitor control transistor T3 is electrically connected to a first terminal of the storage capacitor C2, and a source electrode of the first capacitor control transistor T3 is electrically connected to the anode of the photodiode D0;

a gate electrode of the second capacitor control transistor T2 is electrically connected to a second capacitor control signal line G2, a drain electrode of the second capacitor control transistor T2 is electrically connected to the cathode of the photodiode D0, and a source electrode of the second capacitor control transistor T2 is electrically connected to the second terminal of the storage capacitor C2;

the first capacitor control signal line G3 is configured to provide the first capacitor control signal, and the second capacitor control signal line G2 is configured to provide the second capacitor control signal;

the voltage supply circuit includes a bias control voltage terminal Vt and a bias control voltage supply circuit 121;

the bias control voltage terminal Vt is electrically connected to an anode of the photodiode D0, and the bias control voltage supply circuit 121 is configured to provide a negative voltage VD or a positive voltage VDD to the bias control voltage terminal Vt;

the switch control circuit 13 includes a switch control transistor T1; where a gate electrode of the switch control transistor T1 is electrically connected to the switch control terminal G1, a drain electrode of the switch control transistor T1 is electrically connected to the cathode of the photodiode D0, and a source electrode of the switch control transistor T1 is electrically connected to the positive input terminal of the integral operational amplifier A1;

a negative input terminal of the integral operational amplifier A1 is electrically connected to a reference voltage terminal; the reference voltage terminal is configured to provide a reference voltage Vref;

a first terminal of the integrating capacitor C1 is electrically connected to the positive input terminal of the integral operational amplifier A1, and a second terminal of the integrating capacitor C1 is electrically connected to an output terminal Vout of the integral operational amplifier A1;

a control terminal of the discharge switch K1 is electrically connected to a discharge control terminal G0, a first terminal of the discharge switch K1 is electrically connected to the positive input terminal of the integral operational amplifier A1, and a second terminal of the discharge switch K1 is electrically connected to the output terminal Vout of the integral operational amplifier A1, and the discharge switch K1 is configured to perform control to connect/disconnect the positive input terminal of the integral operational amplifier A1 to/from the output terminal Vout of the integral operational amplifier A1 under control of a discharge control signal provided by the discharge control terminal G0.

In at least one embodiment as shown in FIG. 9, all the transistors are n-type thin film transistors, but the present disclosure is not limited thereto.

Figure 10:
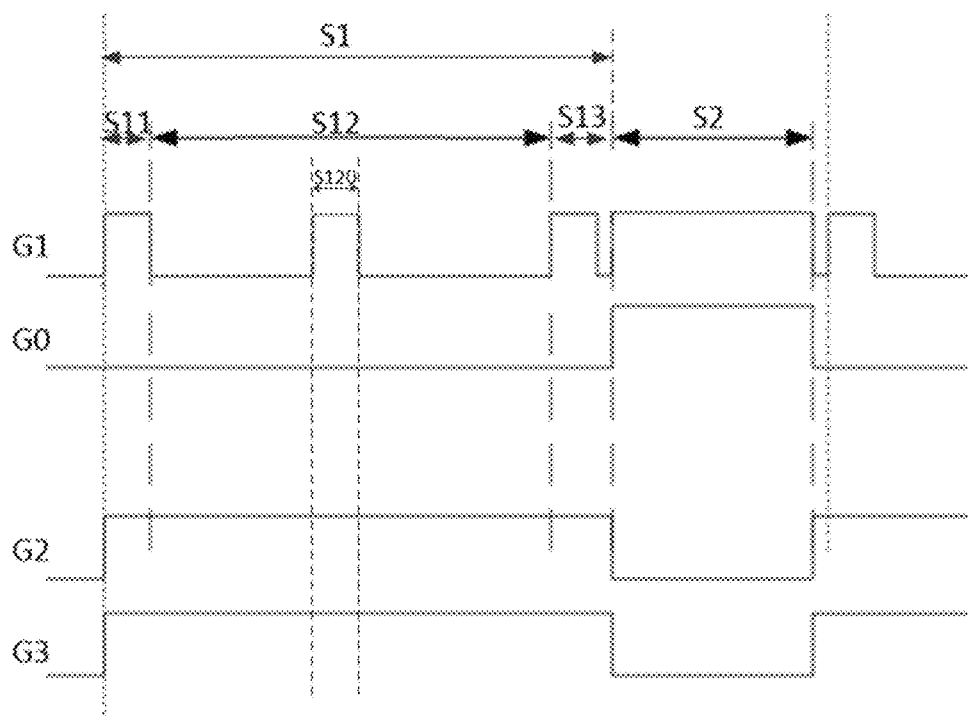
FIG. 10 is an operation timing diagram of a fingerprint identification and detection circuit, when under strong ambient light, according to at least one embodiment of the present disclosure as shown in FIG. 9.

As shown in FIG. 10, when the fingerprint identification and detection circuit as shown in FIG. 9 is in operation under strong ambient light, one frame of time may include a fingerprint identification and detection stage S1 and an image lag elimination stage S2 that are arranged sequentially, where the fingerprint identification and detection stage S1 includes a reset period S11, an integration period S12 and an acquisition period S13 arranged sequentially;

the integration period S12 includes an integral reset sub-period S120;

in the integral reset sub-period S120, the discharge switch K1, under control of the discharge control terminal G0, switches on the connection between the positive input terminal of A1 and the output terminal Vout of A1, and is configured to reset the integral operational amplifier;

in a period included in the fingerprint identification and detection stage S1 other than the integral reset sub-period S120, the discharge switch K1, under control of the discharge control terminal G0, switches off the connection between the positive input terminal of A1 and the output terminal Vout of A1;

in the fingerprint identification and detection stage S1, the bias control voltage supply circuit 121 provides a negative voltage VD to the bias control voltage terminal Vt, the anode of D0 is fed with VD, D0 is backward biased. D0 is in a photoelectric conversion state, and converts the received optical signal into a current signal; a high level is inputted from both G2 and G3, T2 and T3 are both turned on;

during the reset period S11, a high level is inputted from G1 and T1 is turned on. Since A1 is virtual short, the cathode of D0 is fed with Vref, which can ensure that collected charges of each row are integrated from the same potential;

during the integration period S12, a low level is inputted from G1, T1 is turned off. D0 converts the received optical signal into a current signal to charge C2, while photo-charges are accumulated on D0. As the integration process progresses, D0 has a decreased cathode voltage after being exposed to light;

during the acquisition period S13, a high level is inputted from G1, T1 is turned on, and the photo-charges accumulated on D0 are transferred to C1 to realize the integration function, and the voltage outputted by Vout is changed accordingly. Fingerprint identification can be performed according to the voltage.

after the optical fingerprint collection is completed, T2 and T3 are turned off, so that C2 is disabled. The photodiode D0 may have defects on its surface due to the manufacturing process. Such defects may cause D0 to release the accumulated photo-charges slowly, causing image lag. In the acquisition period included in the next frame of time, the residual charges of the previous frame on D0 will be collected, so the residual charges on D0 should be flushed out;

in the image lag elimination stage S2, a high level is inputted from G1, a low level is inputted from both G2 and G3. The discharge switch K1, under control of the discharge control terminal G0, performs control to connect the positive input terminal of A1 to the output terminal Vout of A1. The bias control voltage supply circuit 121 provides a positive voltage VDD to the bias control voltage terminal Vt, the anode of D0 is fed with VDD, D0 is in a forward biased state. VDD is passed to the anode of D0. The residual charges on D0 are transferred to the subsequent circuit to be released, thereby completing the image lag elimination. The capacitor does not require the image lag elimination operation, and can directly discharge the charges within.

In at least one embodiment of the present disclosure, the duration of the integration period S12 generally ranges from tens of milliseconds to hundreds of milliseconds, but the present disclosure is not limited thereto.

Figure 11:
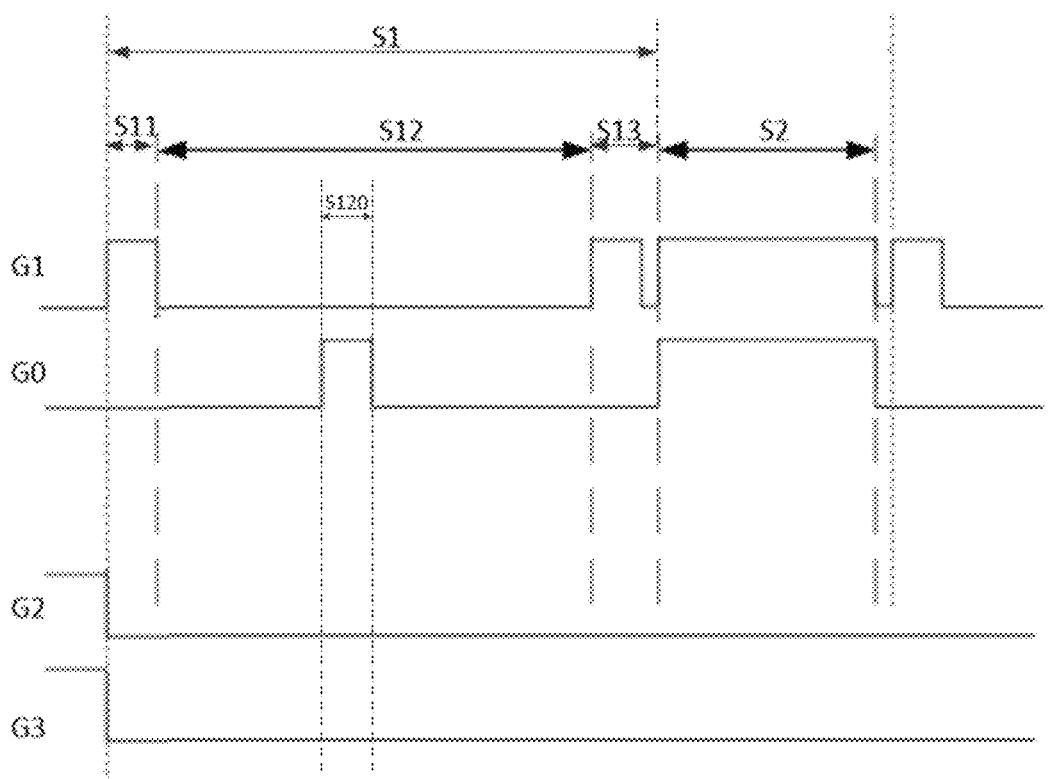
FIG. 11 is an operation timing diagram of a fingerprint identification and detection circuit, when under weak ambient light, according to at least one embodiment of the present disclosure as shown in FIG. 9.

As shown in FIG. 11, when the fingerprint identification and detection circuit as shown in FIG. 9 operates under weak ambient light, one frame of time may include a fingerprint identification and detection stage S1 and an image lag elimination stage S2 that are arranged sequentially, where the fingerprint identification and detection stage S1 includes a reset period S11, an integration period S12 and an acquisition period S13 arranged sequentially.

In the fingerprint identification and detection stage S1 and the image lag elimination stage S2, a low level is inputted from both G2 and G3, T2 and T3 are turned off. That is, since somewhat less strong light generally does not saturate D0, C2 is disabled under weak ambient light, but it is still necessary to eliminate the image lag of D0.

The integration period S12 includes an integral reset sub-period S120.

In the integral reset sub-period S120, under control of the discharge control terminal G0, the discharge switch K1 switches on the connection between the positive input terminal of A1 and the output terminal Vout of A1, and is configured to reset the integral operational amplifier.

During a period included in the fingerprint identification and detection stage S1 other than the integration reset sub-period S120, the discharge switch K1, under control of the discharge control terminal G0, switches off the connection between the positive input terminal of A1 and the output terminal Vout of A1.

In the fingerprint identification and detection stage S1, the bias control voltage supply circuit 121 provides a negative voltage VD to the bias control voltage terminal Vt, the anode of D0 is fed with VD, D0 is backward biased. D0 is in the photoelectric conversion state, and converts the received optical signal into a current signal.

In the reset period S11, a high level is inputted from G1, and T1 is turned on. Because A1 is virtual short, the cathode of D0 is fed with Vref, which can ensure that the collected charges of each row are integrated from the same potential.

During the integration period S12, a low level is inputted from G1, T1 is turned off. D0 converts the received optical signal into a current signal to charge C2, while photo-charges are accumulated on D0. As the integration process progresses, D0 has a decreased cathode voltage after being exposed to light.

During the acquisition period S13, a high level is inputted from G1, T1 is turned on, and the photo-charges accumulated on D0 are transferred to C1 to realize the integration function, and the voltage outputted by Vout is changed accordingly. Fingerprint identification can be performed according to the voltage.

Due to the manufacturing process of the photodiode D0, the photodiode D0 may have defects on its surface. Such defects may cause D0 to release the accumulated photo-charges slowly, causing image lag. In the acquisition period included in the next frame of time, the residual charges of the previous frame on D0 will be collected, so the residual charges on D0 should be flushed out.

In the image lag elimination stage S2, a high level is inputted from G1, and the discharge switch K1 performs control to connect the positive input terminal of A1 to the output terminal Vout of A1 under control of the discharge control terminal G0. The bias control voltage supply circuit 121 provides a positive voltage VDD to the bias control voltage terminal Vt, The anode of D0 is fed with VDD, and D0 is in a forward-biased state. VDD is passed to the anode of D0. The residual charges on D0 are transferred to the subsequent circuit to be released, thereby completing the image lag elimination operation. The capacitor does not require the image lag elimination operation, and can directly discharge the charges within.

The fingerprint identification and detection method according to at least one embodiment of the present disclosure is applied to the above-mentioned fingerprint identification and detection circuit. The fingerprint identification and detection method includes: converting, by the photoelectric conversion element when in a photoelectric conversion state, a received optical signal into a corresponding electrical signal; performing control, by the capacitor control circuit, to store at least part of the electrical signal to the storage capacitor under control of a capacitor control signal.

In the fingerprint identification and detection method according to at least one embodiment of the present disclosure, in the fingerprint identification and detection stage, the photoelectric conversion element is in a photoelectric conversion state, and converts the received optical signal into a corresponding electrical signal. Under strong ambient light, the capacitor control circuit can perform control, under control of the capacitor control signal, to transfer the charges accumulated on the photoelectric conversion element to the storage capacitor, thereby increasing the photoelectric conversion dynamic range of the photoelectric conversion element, and reducing the impact of ambient light on the accuracy of fingerprint identification.

Optionally, the fingerprint identification and detection circuit may further include a voltage supply circuit; and the fingerprint identification and detection method may further include:

providing, by the voltage supply circuit, a first bias control voltage to a first electrode of the photoelectric conversion element to control the photoelectric conversion element to be in the photoelectric conversion state, or, providing, by the voltage supply circuit, a second bias control voltage to the first electrode of the photoelectric conversion element to control the photoelectric conversion element to be in a forward biased state.

In the fingerprint identification and detection stage, the voltage supply circuit provides a first bias control voltage to a first electrode of the photoelectric conversion element, to control the photoelectric conversion element to be in the photoelectric conversion state.

In an image lag elimination stage, the voltage supply circuit provides a second bias control voltage to the first electrode of the photoelectric conversion element to control the photoelectric conversion element to be in a forward biased state to discharge the charges in the photoelectric conversion element, thereby exporting all the charges in the photoelectric conversion element, so as not to affect the imaging quality of the photoelectric conversion element, and eliminate image lags.

When the fingerprint identification and detection circuit according to at least one embodiment of the present disclosure is in operation under strong ambient light, in the fingerprint identification and detection stage, the voltage supply circuit provides a first bias control voltage to the first electrode of the photoelectric conversion element to control the photoelectric conversion element to be in a photoelectric conversion state, the photoelectric conversion element converts the received optical signal into a corresponding electrical signal. A capacitor control circuit performs control, under control of a capacitor control signal, to connect a first terminal of the storage capacitor to a first electrode of the photoelectric conversion element, and connect a second terminal of the storage capacitor to a second electrode of the photoelectric conversion element, so that charges accumulated on the photoelectric conversion element can be transferred to the storage capacitor, thereby increasing the photoelectric conversion dynamic range of the photoelectric conversion element, and mitigating the impact of ambient light on the accuracy of fingerprint identification.

Specifically, when intensity of ambient light is greater than a predetermined intensity, the fingerprint identification and detection stage includes a reset period, an integration period and an acquisition period arranged sequentially; and the fingerprint identification and detection method includes:

in the fingerprint identification and detection stage, performing control, by the capacitor control circuit under control of the capacitor control signal, to connect a first terminal of the storage capacitor to the first electrode of the photoelectric conversion element, and connect a second terminal of the storage capacitor to a second electrode of the photoelectric conversion element; the voltage supply circuit provides a first bias control voltage to the first electrode of the photoelectric conversion element to control the photoelectric conversion element to be in a photoelectric conversion state;

in the reset period, controlling the second electrode of the photoelectric conversion element to be fed with a reference voltage;

in the integration period, converting, by the photoelectric conversion element, a received optical signal into a corresponding electrical signal, and charging the storage capacitor with the electrical signal to change a voltage at the second electrode of the photoelectric conversion element;

in the acquisition period, fingerprint identification may be performed based on the voltage at the second electrode of the photoelectric conversion element.

In at least one embodiment of the present disclosure, the predetermined intensity may be 5000 nits, but the present disclosure is not limited thereto.

In a specific implementation, under strong ambient light, the capacitor control circuit performs control to connect the first terminal of the storage capacitor to the first electrode of the photoelectric conversion element, and connect the second terminal of the storage capacitor to the second electrode of the photoelectric conversion element, to increase the control system capacitance, prevent the photoelectric conversion element from being saturated, and increase the dynamic measurement range.

Specifically, the fingerprint identification and detection circuit further includes a switch control circuit and a discharge voltage terminal; and the fingerprint identification and detection method further includes:

in an image lag elimination stage, performing control, by the capacitor control circuit under control of the capacitor control signal, to disconnect the first terminal of the storage capacitor from the first electrode of the photoelectric conversion element, and disconnect the second terminal of the storage capacitor from the second electrode of the photoelectric conversion element;

in the image lag elimination stage, providing, by the voltage supply circuit, a second bias control voltage to the first electrode of the photoelectric conversion element to control the photoelectric conversion element to be in a forward biased state, and performing control, by the switch control circuit, to connect electrically the second electrode of the photoelectric conversion element to the discharge voltage terminal under control of the switch control signal, to discharge charges in the photoelectric conversion element to the discharge voltage terminal.

In specific implementation, the fingerprint identification and detection circuit may further include a switch control circuit and a discharge voltage terminal. In the image lag elimination stage, the voltage supply circuit provides a second bias control voltage to the first electrode of the photoelectric conversion element to control the photoelectric conversion element to be in a forward-biased state to release the charges in the photoelectric conversion element to the discharge voltage terminal, so as to force out the accumulated invalid charges, thereby improving the fingerprint imaging quality.

Specifically, when the intensity of ambient light is less than or equal to the predetermined intensity, the fingerprint identification and detection stage includes the reset period, the integration period and the acquisition period arranged sequentially; and the fingerprint identification and detection method includes:

in the fingerprint identification and detection stage, performing control, by the capacitor control circuit under control of the capacitor control signal, to disconnect the first terminal of the storage capacitor from the first electrode of the photoelectric conversion element, and disconnect the second terminal of the storage capacitor from the second electrode of the photoelectric conversion element; the voltage supply circuit provides the first bias control voltage to the first electrode of the photoelectric conversion element to control the photoelectric conversion element to be in the photoelectric conversion state;

in the reset period, controlling the second electrode of the photoelectric conversion element to be fed with a reference voltage;

in the integration period, converting, by the photoelectric conversion element, a received optical signal into a corresponding electrical signal, and charging the storage capacitor with the electrical signal to change a voltage at the second electrode of the photoelectric conversion element;

in the acquisition period, performing fingerprint identification based on the voltage at the second electrode of the photoelectric conversion element.

In a specific implementation, under weak ambient light, no storage capacitor is needed. Under control of a capacitor control signal, the capacitor control circuit performs control to disconnect the first terminal of the storage capacitor from the first electrode of the photoelectric conversion element, and disconnect the second terminal of the storage capacitor from the second electrode of the photoelectric conversion element.

Specifically, the fingerprint identification and detection circuit may further include a switch control circuit and a discharge voltage terminal; and the fingerprint identification and detection method further includes:

in an image lag elimination stage, performing control, by the capacitor control circuit under control of the capacitor control signal, to disconnect the first terminal of the storage capacitor from the first electrode of the photoelectric conversion element, and disconnect the second terminal of the storage capacitor from the second electrode of the photoelectric conversion element;

in the image lag elimination stage, providing, by the voltage supply circuit, a second bias control voltage to the first electrode of the photoelectric conversion element to control the photoelectric conversion element to be in a forward biased state, and performing control, by the switch control circuit, to connect electrically the second electrode of the photoelectric conversion element to the discharge voltage terminal under control of the switch control signal, to discharge charges in the photoelectric conversion element to the discharge voltage terminal.

In specific implementation, the fingerprint identification and detection circuit may further include a switch control circuit and a discharge voltage terminal. In the image lag elimination stage, the voltage supply circuit provides a second bias control voltage to the first electrode of the photoelectric conversion element to control the photoelectric conversion element to be in a forward-biased state, to release the charges in the photoelectric conversion element to the discharge voltage terminal, so as to force out the accumulated invalid charges, thereby improving the fingerprint imaging quality.

In a specific implementation, the fingerprint identification and detection circuit further includes: a switch control circuit, an integral operational amplifier, an integrating capacitor and a discharge switch; and the fingerprint identification and detection method further includes: in the integration reset sub-period, performing control, by the discharge switch under control of a discharge control signal, to connect a positive input terminal of the integral operational amplifier to an output terminal of the integral operational amplifier;

in a period included in the fingerprint identification and detection stage other than the integration reset sub-period, performing control, by the discharge switch under control of the discharge control signal, to disconnect the positive input terminal of the integral operational amplifier from the output terminal of the integral operational amplifier;

the controlling the second electrode of the photoelectric conversion element to be fed with the reference voltage in the reset period includes:

performing control, by the switch control circuit under control of the switch control signal, to connect the second electrode of the photoelectric conversion element to the positive input terminal of the integral operational amplifier, to control the second electrode of the photoelectric conversion element to be fed with the reference voltage;

the fingerprint identification and detection method further includes:

in the integration period, performing control, by the switch control circuit under control of the switch control signal, to disconnect the second electrode of the photoelectric conversion element from the positive input terminal of the integral operational amplifier;

in the acquisition period, performing control, by the switch control circuit under control of the switch control signal, to connect the second electrode of the photoelectric conversion element to the positive input terminal of the integral operational amplifier to pass charges stored in the storage capacitor into the integral operational amplifier, to correspondingly change a voltage at the output terminal of the integral operational amplifier, so as to perform the fingerprint identification based on the voltage.

Specifically, the fingerprint identification and detection method according to at least one embodiment of the present disclosure may further include:

in the image lag elimination stage, performing control, by the capacitor control circuit under control of the capacitor control signal, to disconnect the first terminal of the storage capacitor from the first electrode of the photoelectric conversion element, and disconnect the second terminal of the storage capacitor from the second electrode of the photoelectric conversion element;

in the image lag elimination stage, providing, by the voltage supply circuit, the second bias control voltage to the first electrode of the photoelectric conversion element to control the photoelectric conversion element to be in a forward biased state; performing control, by the discharge switch under control of the discharge control signal, to connect the positive input terminal of the integral operational amplifier to the output terminal of the integral operational amplifier; and performing control, by the switch control circuit under control of the switch control signal, to connect the second electrode of the photoelectric conversion element to the positive input terminal of the integral operational amplifier, to discharge the charges in the photoelectric conversion element.

The display device according to at least one embodiment of the present disclosure includes the above-mentioned fingerprint identification and detection circuit.

The display device provided by at least one embodiment of the present disclosure may be any product or component with a display function, such as a mobile phone, a tablet computer, a television, a monitor, a notebook computer, a digital photo frame, or a navigator.

The above descriptions are some embodiments of the present disclosure. It should be noted that, modifications and improvements may be made by a person of ordinary skill in the art without departing from the principle of the present disclosure, and these modifications and improvements shall fall within the scope of the present disclosure.

What is claimed is:

1. A fingerprint identification and detection circuit, comprising:
a storage capacitor;
a capacitor control circuit; and
a photoelectric conversion element,
wherein:
the photoelectric conversion element is configured to, when in a photoelectric conversion state, convert a received optical signal into a corresponding electrical signal;
the capacitor control circuit is provided between the storage capacitor and the photoelectric conversion element, and is configured to perform control to store at least part of the electrical signal to the storage capacitor under control of a capacitor control signal;
the capacitor control circuit comprises a first capacitor control transistor and a second capacitor control transistor;
the capacitor control signal comprises a first capacitor control signal and a second capacitor control signal;
a control electrode of the first capacitor control transistor is electrically connected to a first capacitor control signal line, a first electrode of the first capacitor control transistor is electrically connected to a first terminal of the storage capacitor, and a second electrode of the first capacitor control transistor is electrically connected to a first electrode of the photoelectric conversion element;
a control electrode of the second capacitor control transistor is electrically connected to a second capacitor control signal line, a first electrode of the second capacitor control transistor is electrically connected to a second electrode of the photoelectric conversion element, and a second electrode of the second capacitor control transistor is electrically connected to a second terminal of the storage capacitor; and
the first capacitor control signal line is configured to provide the first capacitor control signal, and the second capacitor control signal line is configured to provide the second capacitor control signal.

2. The fingerprint identification and detection circuit according to claim 1, further comprising: a voltage supply circuit; wherein
the voltage supply circuit is configured to provide a first bias control voltage to a first electrode of the photoelectric conversion element, to control the photoelectric conversion element to be in the photoelectric conversion state, or, provide a second bias control voltage to the first electrode of the photoelectric conversion element, to control the photoelectric conversion element to be in a forward biased state.

3. The fingerprint identification and detection circuit according to claim 1, further comprising: a switch control circuit and a discharge voltage terminal; wherein
the switch control circuit is configured to perform control to connect electrically a second electrode of the photoelectric conversion element to the discharge voltage terminal under control of a switch control signal, to discharge charges in the photoelectric conversion element to the discharge voltage terminal.

4. The fingerprint identification and detection circuit according to claim 1, further comprising: a reset circuit; wherein
the reset circuit is configured to provide a reset voltage to a second electrode of the photoelectric conversion element.

5. The fingerprint identification and detection circuit according to claim 1, wherein the photoelectric conversion element is a photodiode, a first electrode of the photoelectric conversion element is an anode of the photodiode, and a second electrode of the photoelectric conversion element is a cathode of the photodiode.

6. The fingerprint identification and detection circuit according to claim 2, wherein the voltage supply circuit comprises a first voltage supply transistor and a second voltage supply transistor; wherein
a control electrode of the first voltage supply transistor is electrically connected to a first voltage supply control line, a first electrode of the first voltage supply transistor is electrically connected to a first bias control voltage terminal, and a second electrode of the first voltage supply transistor is electrically connected to the first electrode of the photoelectric conversion element;

a control electrode of the second voltage supply transistor is electrically connected to a second voltage supply control line, a first electrode of the second voltage supply transistor is electrically connected to a second bias control voltage terminal, and a second electrode of the second voltage supply transistor is electrically connected to the first electrode of the photoelectric conversion element;

the first bias control voltage terminal is configured to provide the first bias control voltage, and the second bias control voltage terminal is configured to provide the second bias control voltage.

7. The fingerprint identification and detection circuit according to claim 2, wherein the voltage supply circuit comprises a bias control voltage terminal and a bias control voltage supply circuit; wherein the bias control voltage terminal is electrically connected to the first electrode of the photoelectric conversion element, and the bias control voltage supply circuit is configured to supply the first bias control voltage or the second bias control voltage to the bias control voltage terminal.

8. The fingerprint identification and detection circuit according to claim 1, further comprising: a switch control circuit, an integral operational amplifier, an integrating capacitor and a discharge switch; wherein the switch control circuit is electrically connected to a switch control terminal, a second electrode of the photoelectric conversion element, and a positive input terminal of the integral operational amplifier, respectively, and is configured to perform control to connect/disconnect the second electrode of the photoelectric conversion element to/from the positive input terminal of the integral operational amplifier under control of a switch control signal provided by the switch control terminal;

a negative input terminal of the integral operational amplifier is electrically connected to a reference voltage terminal;

a first terminal of the integrating capacitor is electrically connected to the positive input terminal of the integral operational amplifier, and a second terminal of the integrating capacitor is electrically connected to an output terminal of the integral operational amplifier;

a control terminal of the discharge switch is electrically connected to a discharge control terminal, a first terminal of the discharge switch is electrically connected to the positive input terminal of the integral operational amplifier, and a second terminal of the discharge switch is electrically connected to the output terminal of the integral operational amplifier, and the discharge switch is configured to perform control to connect/disconnect the positive input terminal of the integral operational amplifier to/from the output terminal of the integral operational amplifier under control of a discharge control signal provided by the discharge control terminal.

9. The fingerprint identification and detection circuit according to claim 8, wherein the switch control circuit comprises a switch control transistor;

a control electrode of the switch control transistor is electrically connected to the switch control terminal, a first electrode of the switch control transistor is electrically connected to the second electrode of the photoelectric conversion element, and a second electrode of the switch control transistor is electrically connected to the positive input terminal of the integral operational amplifier.

10. The fingerprint identification and detection circuit according to claim 1, further comprising: an ambient light intensity detection circuit; wherein the ambient light intensity detection circuit is configured to detect an intensity of ambient light and control the capacitor control signal according to the intensity.

11. A fingerprint identification and detection method, applied to the fingerprint identification and detection circuit according to claim 1, comprising:

converting, by the photoelectric conversion element when in a photoelectric conversion state, a received optical signal into a corresponding electrical signal;

performing control, by the capacitor control circuit, to store at least part of the electrical signal to the storage capacitor under control of a capacitor control signal.

12. The fingerprint identification and detection method according to claim 11, wherein the fingerprint identification and detection circuit further comprises a voltage supply circuit, and the method further comprises:

providing, by the voltage supply circuit, a first bias control voltage to a first electrode of the photoelectric conversion element to control the photoelectric conversion element to be in the photoelectric conversion state, or, providing, by the voltage supply circuit, a second bias control voltage to the first electrode of the photoelectric conversion element to control the photoelectric conversion element to be in a forward biased state.

13. The fingerprint identification and detection method according to claim 12, wherein a fingerprint identification and detection stage comprises a reset period, an integration period and an acquisition period arranged sequentially when an intensity of ambient light is greater than a predetermined intensity, and the method comprises:

in the fingerprint identification and detection stage, performing control, by the capacitor control circuit under control of the capacitor control signal, to connect a first terminal of the storage capacitor to the first electrode of the photoelectric conversion element, and connect a second terminal of the storage capacitor to a second electrode of the photoelectric conversion element, wherein the voltage supply circuit provides a first bias control voltage to the first electrode of the photoelectric conversion element to control the photoelectric conversion element to be in the photoelectric conversion state;

in the reset period, controlling the second electrode of the photoelectric conversion element to be fed with a reference voltage;

in the integration period, converting, by the photoelectric conversion element, a received optical signal into a corresponding electrical signal, and charging the storage capacitor with the electrical signal to change a voltage at the second electrode of the photoelectric conversion element;

in the acquisition period, performing fingerprint identification based on the voltage at the second electrode of the photoelectric conversion element.

14. The fingerprint identification and detection method according to claim 13, wherein the fingerprint identification and detection circuit further comprises a switch control circuit and a discharge voltage terminal, and the method further comprises:

in an image lag elimination stage, performing control, by the capacitor control circuit under control of the capacitor control signal, to disconnect the first terminal of the storage capacitor from the first electrode of the photoelectric conversion element, and disconnect the second terminal of the storage capacitor from the second electrode of the photoelectric conversion element;

in the image lag elimination stage, providing, by the voltage supply circuit, the second bias control voltage to the first electrode of the photoelectric conversion element to control the photoelectric conversion element to be in a forward biased state, and performing control, by the switch control circuit, to connect electrically the second electrode of the photoelectric conversion element to the discharge voltage terminal under control of the switch control signal to discharge charges in the photoelectric conversion element to the discharge voltage terminal.

15. The fingerprint identification and detection method according to claim 12, wherein the fingerprint identification and detection stage comprises a reset period, an integration period and an acquisition period arranged sequentially when an intensity of ambient light is less than or equal to a predetermined intensity, and the method comprises:

in the fingerprint identification and detection stage, performing control, by the capacitor control circuit under control of the capacitor control signal, to disconnect a first terminal of the storage capacitor from the first electrode of the photoelectric conversion element, and disconnect a second terminal of the storage capacitor from the second electrode of the photoelectric conversion element; wherein the voltage supply circuit provides a first bias control voltage to the first electrode of the photoelectric conversion element to control the photoelectric conversion element to be in the photoelectric conversion state;

in the reset period, controlling the second electrode of the photoelectric conversion element to be fed with a reference voltage;

in the integration period, converting, by the photoelectric conversion element, a received optical signal into a corresponding electrical signal, and charging the storage capacitor with the electrical signal to change a voltage at the second electrode of the photoelectric conversion element;

in the acquisition period, performing fingerprint identification based on the voltage at the second electrode of the photoelectric conversion element.

16. The fingerprint identification and detection method according to claim 15, wherein the fingerprint identification and detection circuit further comprises a switch control circuit and a discharge voltage terminal, and the method further comprises:

in an image lag elimination stage, performing control, by the capacitor control circuit under control of the capacitor control signal, to disconnect the first terminal of the storage capacitor from the first electrode of the photoelectric conversion element, and disconnect the second terminal of the storage capacitor from the second electrode of the photoelectric conversion element;

in the image lag elimination stage, providing, by the voltage supply circuit, the second bias control voltage to the first electrode of the photoelectric conversion element to control the photoelectric conversion element to be in a forward biased state, and performing control, by the switch control circuit, to connect electrically the second electrode of the photoelectric conversion element to the discharge voltage terminal under control of the switch control signal to discharge charges in the photoelectric conversion element to the discharge voltage terminal.

17. The fingerprint identification and detection method according to claim 13, wherein the fingerprint identification and detection circuit further comprises: a switch control circuit, an integral operational amplifier, an integrating capacitor and a discharge switch;

the integration period comprises an integration reset sub-period; and the method further comprises: in the integration reset sub-period, performing control, by the discharge switch under control of a discharge control signal, to connect a positive input terminal of the integral operational amplifier to an output terminal of the integral operational amplifier; and in a period comprised in the fingerprint identification and detection stage other than the integration reset sub-period, performing control, by the discharge switch under control of the discharge control signal, to disconnect the positive input terminal of the integral operational amplifier from the output terminal of the integral operational amplifier;

the controlling the second electrode of the photoelectric conversion element to be fed with the reference voltage in the reset period comprises: performing control, by the switch control circuit under control of the switch control signal, to connect the second electrode of the photoelectric conversion element to the positive input terminal of the integral operational amplifier to control the second electrode of the photoelectric conversion element to be fed with the reference voltage;

the method further comprises:

in the integration period, performing control, by the switch control circuit under control of the switch control signal, to disconnect the second electrode of the photoelectric conversion element from the positive input terminal of the integral operational amplifier;

in the acquisition period, performing control, by the switch control circuit under control of the switch control signal, to connect the second electrode of the photoelectric conversion element to the positive input terminal of the integral operational amplifier to pass charges stored in the storage capacitor into the integral operational amplifier, to correspondingly change a voltage at the output terminal of the integral operational amplifier, so as to perform the fingerprint identification based on the voltage.

18. The fingerprint identification and detection method according to claim 16, further comprising:

in the image lag elimination stage, performing control, by the capacitor control circuit under control of the capacitor control signal, to disconnect the first terminal of the storage capacitor from the first electrode of the photoelectric conversion element, and disconnect the second terminal of the storage capacitor from the second electrode of the photoelectric conversion element;

in the image lag elimination stage, providing, by the voltage supply circuit, the second bias control voltage to the first electrode of the photoelectric conversion element to control the photoelectric conversion element to be in a forward biased state; performing control, by the discharge switch under control of the discharge control signal, to connect the positive input terminal of the integral operational amplifier to the output terminal of the integral operational amplifier; and performing control, by the switch control circuit under control of the switch control signal, to connect the second electrode of the photoelectric conversion element to the positive input terminal of the integral operational amplifier, to discharge the charges in the photoelectric conversion element.

19. A display device, comprising the fingerprint identification and detection circuit according to claim 1.

* * * * *